(12) United States Patent
Wright et al.

(10) Patent No.: US 6,411,410 B1
(45) Date of Patent: Jun. 25, 2002

(54) WAVELENGTH-DIVISION MULTIPLEXING IN PASSIVE OPTICAL NETWORKS

(75) Inventors: Ian Robert Wright, Harrow Weald; Peter Raymond Ball, Pinner; Mark John Robinson, London, all of (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/034,828

(22) Filed: Mar. 4, 1998

(30) Foreign Application Priority Data

Mar. 5, 1997 (GB) .............................. 9704587

(51) Int. Cl.$^7$ ............................... H04J 14/02

(52) U.S. Cl. ................ 359/125; 359/123; 359/124; 359/133; 359/137

(58) Field of Search ................ 359/124, 125, 359/123, 137, 133

(56) References Cited

U.S. PATENT DOCUMENTS

| | | | | |
|---|---|---|---|---|
| 5,018,130 A | * | 5/1991 | Suzuki et al. | 370/1 |
| 5,208,691 A | * | 5/1993 | Nishio | 359/123 |
| 5,398,129 A | * | 3/1995 | Reimann | 359/137 |

(List continued on next page.)

FOREIGN PATENT DOCUMENTS

| | | |
|---|---|---|
| EP | 0 438 155 | 7/1991 |
| EP | 0 447 752 | 9/1991 |
| EP | 0 486 874 | 5/1992 |
| EP | 0 497 005 | 8/1992 |
| EP | 0 544 216 | 6/1993 |
| EP | 0 599 177 | 6/1994 |
| EP | 0 691 760 | 1/1996 |

OTHER PUBLICATIONS

"Architecture and Technology Considerations for Multimedia Broadband Communications", by Marek R. Wernik Globecom '88 IEEE Global Telecommunications Conference and Exhibition–Communications for the Information Age, Hollywood, FL USA Nov. 28 –Dec. 1, 1988, pp. 663–667 vol. 2, XP010071670.

(List continued on next page.)

Primary Examiner—Leslie Pascal
Assistant Examiner—Hanh Phan
(74) Attorney, Agent, or Firm—Katten Muchin Zavis Rosenman

(57) ABSTRACT

An optical line termination (OLT) device (12) generates a plurality of optical signals having different respective wavelengths ($\lambda 1$, $\lambda 2$), each optical signal carrying data, and wavelength-division-multiplexes the optical signals. A plurality of optical network units (ONUs $14_1$–$14_5$) are connected to the OLT device (12) by way of a passive optical network (6) so as to receive the wavelength-division-multiplexed optical signals. Each ONU (14) has a wavelength selection unit operable in dependence upon control information sent from the OLT (12) to the ONU (14) concerned by way of the passive optical network (6) to select one of the optical signals of the plurality, and also has a detector for processing the selected optical signal to derive therefrom the data carried thereby.

The control information may be included in the data-carrying optical signals themselves as overhead information, or may be sent separately by another optical signal that is wavelength-division multiplexed with the data-carrying optical signals.

Such an arrangement can enable the downstream capacity of the passive optical network to be shared flexibly by the different optical receivers.

39 Claims, 19 Drawing Sheets

U.S. PATENT DOCUMENTS

| | | | | |
|---|---|---|---|---|
| 5,483,370 A | * | 1/1996 | Takahashi | 359/128 |
| 5,506,712 A | * | 4/1996 | Sasayama et al. | 359/123 |
| 5,523,870 A | * | 6/1996 | Suzuki et al. | 359/139 |
| 5,541,924 A | * | 7/1996 | Tran et al. | 370/85.3 |
| 5,543,951 A | * | 8/1996 | Moehrmann | 359/158 |
| 5,572,349 A | * | 11/1996 | Hale et al. | 359/137 |
| 5,606,555 A | * | 2/1997 | Singer | 370/465 |
| 5,739,934 A | * | 4/1998 | Nomura et al. | 359/124 |
| 5,761,197 A | * | 6/1998 | Takeman | 370/337 |
| 5,815,295 A | * | 9/1998 | Darcie et al. | 359/128 |
| 5,841,556 A | * | 11/1998 | Hong et al. | 359/117 |
| 5,854,701 A | * | 12/1998 | Clarke et al. | 359/137 |
| 5,936,956 A | * | 8/1999 | Naven | 370/395 |

OTHER PUBLICATIONS

"An Efficient Communications Protocol for High–Speed Packet–Switched Multchannel Networks" by Pierre A. Humblet IEEE Journals on Selected Areas in Communication, vol. 11, No. 4 May 1, 1993, pp. 568–578, XP000402615.

"Performance of Multiple Access WDM Networks With Subcarrier Multiplexed Control Channels" by Shing Fong Su, et al. Journal of Lightwave Technology, IEEE New York, vol. 11 No. 5/6 May 1, 1993, pp. 1028–1033, XP000396730.

* cited by examiner

| | ONU CAPACITY REQUIREMENTS, 'U' (ALLOCATED λ) | | | |
|---|---|---|---|---|
| | TF1 | (λ) | TF2 | (λ) |
| ONU1 | 1/4U | 1 | 1/4U | 1 |
| ONU2 | 1/8U | 2 | 0U | NA |
| ONU3 | 1/8U | 2 | 0U | NA |
| ONU4 | 1/4U | 1 | 1/2U | 2 & 1 |
| ONU5 | 1/4U | 2 | 1/4U | 2 |

WAVELENGTH-DIVISION MULTIPLEXING IN PASSIVE OPTICAL NETWORKS

BACKGROUND OF THE INVENTION

1. Field of the Invention

The present invention relates to wavelength-division multiplexing in passive optical networks.

2. Description of the Prior Art

FIG. 1 shows a block diagram of parts of a conventional communications network employing a passive optical network (PON). The communications network 1 has an optical line termination unit (OLT) 2 and a plurality of optical network units (ONUs) $4_1$ to $4_4$. The ONUs $4_1$ to $4_4$ are connected to the OLT 2 by a passive optical network 6 which consists of optical fibre links 8 and optical splitters 10. The OLT 2 is located at the so-called "head end" of the PON 6 and serves to connect the PON to a core network. Customers or subscribers are connected to the ONUs.

The communications network 1 shown in FIG. 1 may be employed as part of an asynchronous transfer mode (ATM) communications network. In this case, the so-called "downstream traffic", i.e. the data (ATM cells) to be transmitted from the OLT 2 to the ONUs $4_1$ to $4_4$, is broadcast at a single optical wavelength $\lambda 1$ to all of the ONUs and each ONU then selects the appropriate ATM cells destined for it and ignores any other cells.

In the upstream direction, from the ONUs to the OLT, the individual signals from the ONUs 4 are interleaved in a predetermined time-division multiple-access (TDMA) format. For example, in the TDMA format shown in FIG. 1 itself, each ONU $4_i$ is allocated its own time slot $TS_i$ within a frame $FR_{UP}$. All upstream traffic is at a single wavelength $\lambda x$ which may be the same as the downstream wavelength $\lambda 1$ or may be different from $\lambda 1$. The upstream traffic from the ONUs to the OLT will generally be of a much lower data rate than that of the downstream traffic. The maximum capacity of the PON 6 is therefore required to correspond to the maximum data rate of the downstream traffic.

The PON 6 may be of the two-fibre type which is effectively two passive optical networks (two sets of fibre links 8 and optical splitters 10) used in parallel, one for the downstream traffic and the other for the upstream traffic. The capacity of the upstream-traffic PON can, if desired, be lower than that of the downstream-traffic PON.

Alternatively, the PON 6 shown in FIG. 1 may be of the single-fibre type which uses just one set of fibre links 8 and optical splitters 10 to connect the OLT to the ONUs; in this case a return path from the ONUs to the OLT is provided by time-division multiplexing the downstream and upstream traffic over the single-fibre PON. Again, depending on the time-division format used, the effective capacity available to the upstream traffic may be made lower than the effective capacity available to the downstream traffic.

For simplicity, the embodiments described specifically in the present application will make use of the two-fibre type PON but as will be readily apparent the present invention can also be used with single-fibre type PONs.

In order to increase the maximum capacity of a passive optical network it is possible to employ wavelength-division multiplexing. If, for example, the downstream traffic capacity of the PON 6 is $f_{max}$ when the downstream traffic is broadcast on a single wavelength, the capacity of the PON 6 is increased to N x $f_{max}$ when N optical signals at different respective wavelengths are employed to broadcast the downstream traffic.

Using this technique it would be possible to pre-assign each ONU with its own unique wavelength on which to receive data from the OLT 2. However, such an approach is unsatisfactory for two reasons. Firstly, even with state-of-the-art technology a maximum of 32 different wavelengths is presently possible, whereas it may be desired to support over 100 ONUs from the same OLT. Secondly, the downstream traffic requirements for the different ONUs are not fixed over time, so that at any given time the amount of downstream traffic can vary greatly from one ONU to the next. At certain times, some of the ONUs may have no downstream traffic at all. Preassigning all ONUs with an equal or fixed amount of capacity is therefore potentially wasteful of the overall downstream traffic capacity of the PON.

BRIEF SUMMARY OF THE INVENTION

According to a first aspect of the present invention there is provided a communications network including: an optical transmitter for generating a plurality of optical signals having different respective wavelengths, each said optical signal carrying data, and wavelength-division-multiplexing the optical signals; and a plurality of optical receivers connected to the optical transmitter by way of a passive optical network for receiving the wavelength-division-multiplexed optical signals, each receiver having wavelength selection means operable in dependence upon control information sent from the transmitter to the receiver concerned (for example by way of the passive optical network) to select one of the optical signals of the said plurality, and also having detection means for processing the selected optical signal to derive therefrom the data carried thereby.

In such a network the downstream capacity of the passive optical network can be shared flexibly by the different optical receivers.

For example, in the optical transmitter the data to be transmitted to the optical receivers may be allocated to the optical signals of the said plurality dynamically in dependence upon the respective amounts of data which it is desired to transmit to the different optical receivers in a particular time frame. In the optical transmitter, data destined for the optical receivers may, for example, be buffered in queues corresponding respectively to the different optical receivers and the amounts of data for the different optical receivers can then be determined from the queue fill levels.

The control information is preferably sent from the optical transmitter to the optical receiver concerned by way of the passive optical network but may alternatively be sent by way of further communications paths linking the transmitter to the receivers. In this case, the control information could be embodied in radio signals, or in electrical signals carried by dedicated landlines.

To reduce the amount of control information required to be transmitted, the control information preferably specifies only changes in optical signal selection to be made by the optical receivers.

The control information may be carried as overhead information by the optical signals. This keeps the cost of the optical receivers down because the control information can be received through the selected optical signal and detected using the same detector that detects the data.

In one embodiment, the control information relevant to a given optical receiver is carried as overhead information by all of the optical signals. This keeps the design of the optical transmitter simple because it does not need to keep track of the optical signal that the given optical receiver has currently selected. However, the broadcast of the control information on all optical signals is wasteful of the downstream capacity and accordingly in another embodiment the control information relevant to a given optical receiver is carried as overhead information only by the optical signal currently selected by the said given optical receiver.

In this case the optical transmitter preferably has selection storing means for storing the respective current optical-signal selections made by the optical receivers, and overhead information adding means operable, when control information is to be transmitted to one of the said optical receivers, to determine from the stored current optical-signal selections the optical signal of the said plurality that is currently selected by that optical receiver, and to cause the control information to be carried as overhead information only by the determined optical signal.

In another technique for increasing the throughput of data, two or more of the said optical signals may be used to carry simultaneously, as overhead information, different control information relevant to different respective said optical receivers.

It is also possible for the control information to be transmitted from the optical transmitter to the said optical receivers by a further optical signal, having a wavelength different from that of each of said optical signals of the said plurality, that is wavelength-division-multiplexed with the optical signals of the said plurality. This avoids the reduction in data throughput that arises from the use of overhead information in the data-carrying optical signals to transmit the control information.

The control information may be divided into fields corresponding respectively to the said optical signals, each field specifying at least one optical receiver that is to select the corresponding optical signal. The fields then implicitly identify the optical signal to be selected by an optical receiver. The fields are preferably ordered differently in the overhead information carried by the different optical signals such that, for each optical signal, the last field in the overhead information is the field that corresponds to the optical signal concerned. This means that the fields relating to optical signals other than the currently-selected optical signal arrive at the optical receiver before the field relating to the currently-selected optical signal. This can be effective in allowing more time for the optical receivers to select a new optical signal.

To simplify the transmission of data, the data is preferably transmitted in predetermined time slots from the optical transmitter to the optical receivers, and in each time slot respective units of data are transferred substantially synchronously via the optical signals from the optical transmitter to the optical receivers. In this case, the overhead information fields may contain respectively the control information for the different data units that are to be transmitted in the same time slot by the different optical signals.

Each data unit may comprise, for example, at least the payload portion of an ATM cell. In this case, the control information preferably includes addressing information from the ATM cell headers. In an ATM system, such addressing information already implicitly identifies the optical receiver to which the cell payload concerned is to be sent so that there is no need to generate additional, special information for designating the optical receivers.

The overhead information may be transmitted in the intervals between successive time slots. This provides a built-in guard band, between the end of one time slot and the start of the next time slot, in which a new optical signal can be selected. Alternatively, or in addition, the data units transmitted in successive time slots (e.g. four time slots) by each optical signal are combined with the overhead information to form a frame. Such a frame structure can reduce the ratio of overhead information transmission time to data transmission time.

Preferably, the control information is sent in advance of the time slot to which it relates, so as to provide extra time for an optical receiver to effect selection of a new optical signal. Sending the control information in advance is also beneficial if an optical receiver is about to enter a "quiet period" in which it does not require any share of the available bandwidth. In this case, if the optical receiver concerned is required to select a new wavelength to receive data in the first active time slot after the quiet period is over, then the necessary control information specifying the new selection can be sent before the commencement of the quiet period. The control information may, for example, be provided at the head of a frame and specify in advance the optical signal selections (or just the changes in selection) to be made in the time slots of that frame or even in the time slots of a subsequent frame. The control information may also specify the time slots in which the optical receivers should change their optical signal selections. Alternatively, the control information may always be provided one time slot (or a predetermined number of time slots) ahead of a required selection or change in selection. In all cases, each optical receiver may be provided with buffering means for holding the received control information until the time slot concerned.

According to a second aspect of the present invention there is provided an optical transmitter, for connection by way of a passive optical network to a plurality of optical receivers, including: signal transmission means for generating a plurality of optical signals having different respective wavelengths, each said optical signal carrying data, and wavelength-division-multiplexing the optical signals; and control information generation means for generating control information to be sent (for example by way of the said passive optical network) to the said optical receivers to designate which of the optical signals of the said plurality each receiver is to select to derive therefrom the data carried thereby.

The signal transmission means may include: a plurality of transmitter devices corresponding respectively to the said optical signals, each transmitter device being connected to the said transmission control means for receiving therefrom the data allocated by the transmission control means to its corresponding optical signal and being operable to modulate its corresponding optical signal with the allocated data; and wavelength-division-multiplexing combiner means coupled to each of the said transmitter devices for wavelength-division-multiplexing the said optical signals.

If desired, a further transmitter device may be coupled to the said control information generation means and also coupled to the said wavelength-division-multiplexing combiner means for generating a further optical signal, having a wavelength different from that of each of the optical signals of the said plurality, which further optical signal carries the said control information.

According to a third aspect of the present invention there is provided an optical receiver, for connection by way of a passive optical network to an optical transmitter which wavelength-division-multiplexes a plurality of optical signals having different respective wavelengths when in use, each said optical signal carrying data, the optical receiver including: wavelength selection means operable in dependence upon control information sent from the said optical transmitter to the optical receiver (for example by way of the said passive optical network) to select one of the optical signals of the said plurality; and detection means for processing the selected optical signal to derive therefrom the data carried thereby.

The wavelength selection means preferably include a tunable filter connected for receiving the wavelength-division-multiplexed optical signals and operable, in dependence upon a control signal derived from the received control information, to deliver to the said detection means only the said selected optical signal. In this case, only a single detector is required, making the design of the optical receiver simple and cost-effective. If desired, however, the optical receiver may be designed to select two or more optical signals simultaneously (for example by providing two or more tunable filters and corresponding detectors) so as to increase the maximum share of the downstream capacity that can be allocated to the optical receiver.

According to a fourth aspect of the present invention there is provided a communications method, for use in a communications network including an optical transmitter which is connected to a plurality of optical receivers by way of a passive optical network, including: at the optical transmitter, generating a plurality of optical signals having different respective wavelengths, each said optical signal carrying data, and wavelength-division-multiplexing the optical signals; and at each optical receiver, receiving the wavelength-division-multiplexed optical signals and selecting one of them in dependence upon control information sent from the optical transmitter to the optical receiver concerned (for example by way of the passive optical network), and processing the selected optical signal to derive therefrom the data carried thereby.

BRIEF DESCRIPTION OF THE DRAWINGS

FIG. 15 shows a block diagram of an optical line termination unit for use in a second embodiment of the present invention;

DETAILED DESCRIPTION OF THE PREFERRED EMBODIMENTS

Figure 1:
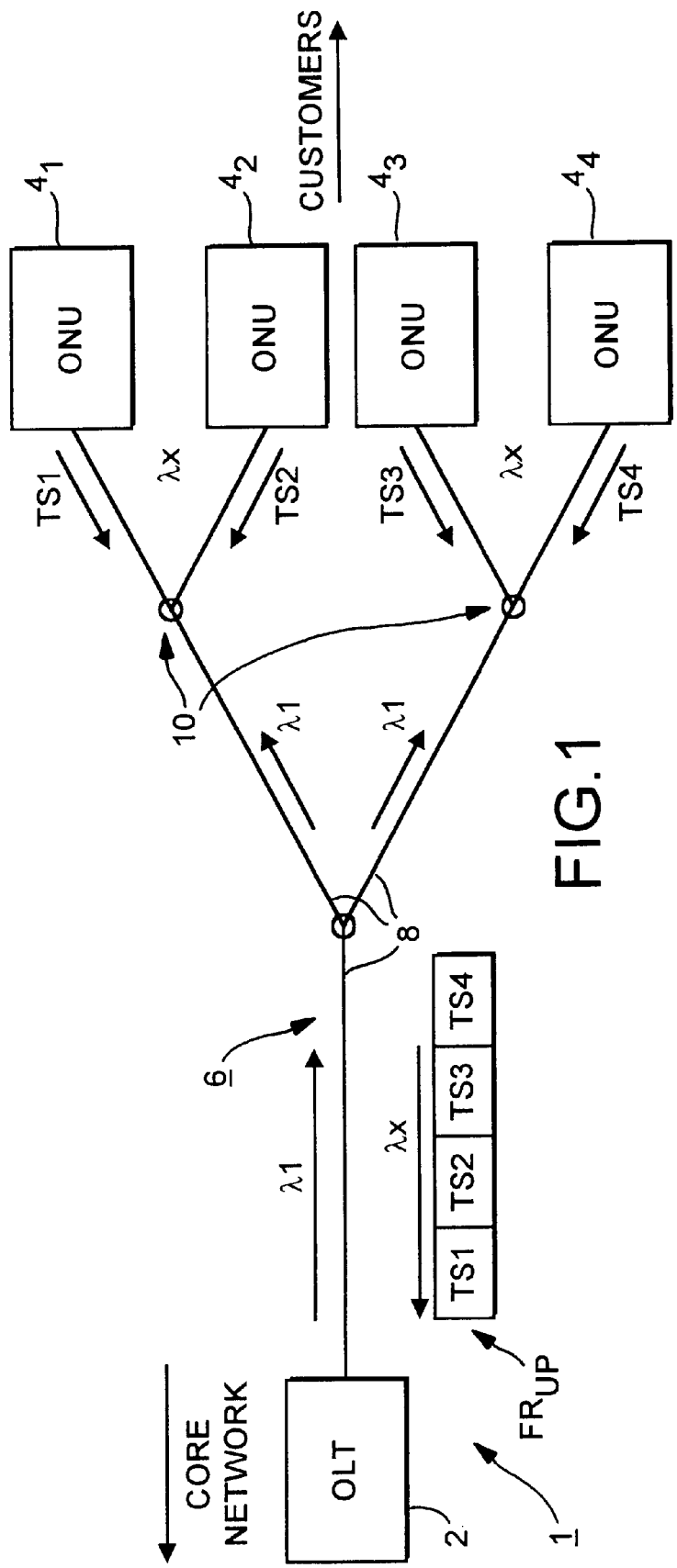
FIG. 1, discussed hereinbefore, shows parts of a conventional communications network employing a passive optical network.
Figure 2:
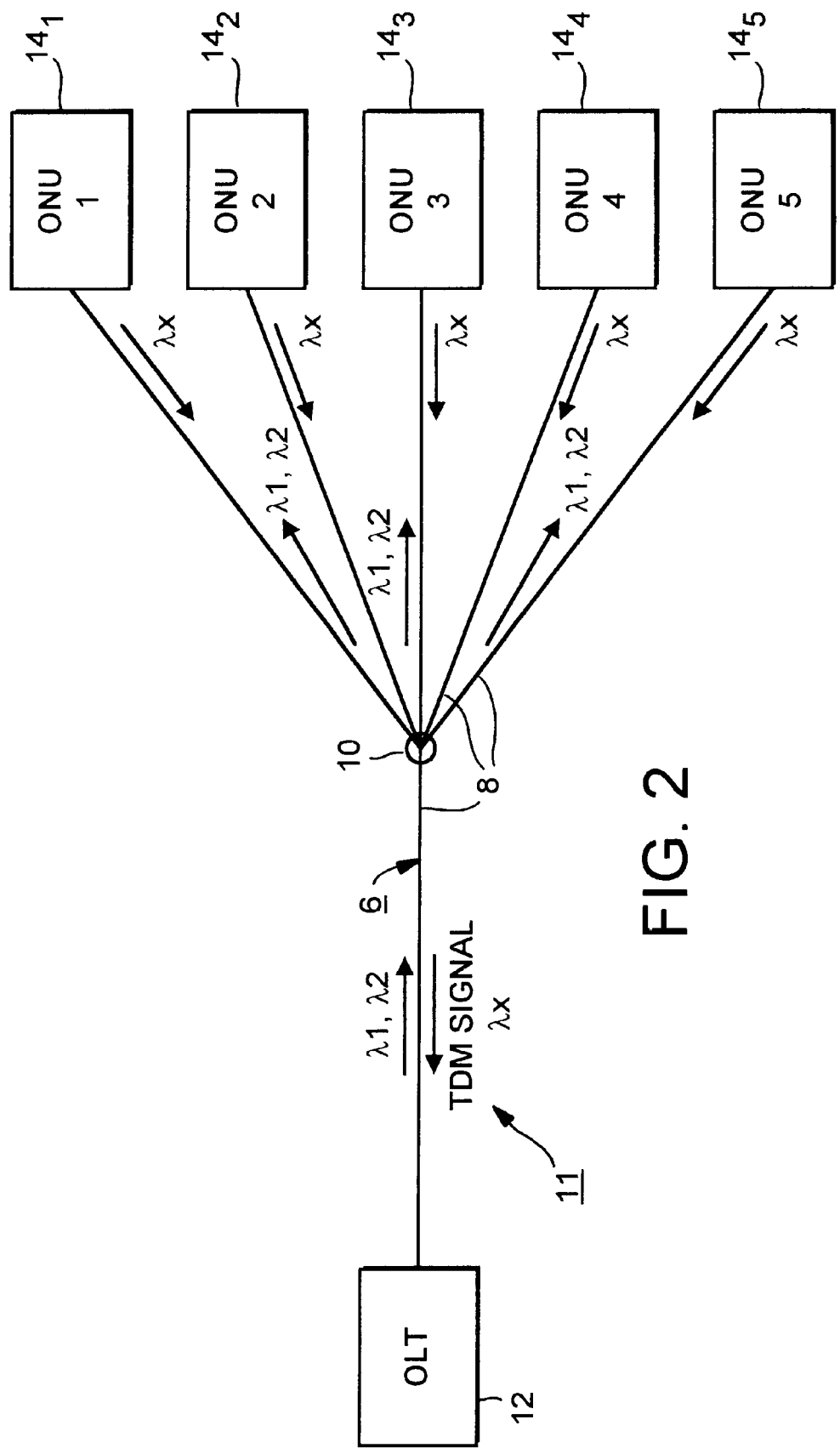
FIG. 2 shows parts of a communications network embodying the present invention.

FIG. 2 shows, by way of example, parts 11 of a communications network embodying the present invention. In the FIG. 2 example, an OLT 12 is connected to five different ONUs $14_1$ to $14_5$ by way of a passive optical network 6 including optical fibres 8 and an optical splitter 10. For the sake of simplicity, in this example the OLT 12 is adapted to transmit the downstream traffic to the ONUs $14_1$ to $14_5$ using just two optical signals S1 and S2 having different respective wavelengths $\lambda 1$ and $\lambda 2$. It will, however, be understood that in practice more wavelengths could be used, for example 4, 16 or even 32 different wavelengths would be possible in the downstream direction.

For the sake of simplicity again, in this example only a single wavelength $\lambda x$ is used in the upstream direction by all of the ONUs $14_1$ to $14_5$ to transmit data in a predetermined TDMA format to the OLT 12. However, it will be appreciated that more than one wavelength could be used by the ONUs to transmit data to the OLT 12.

In the FIG. 2 example, the maximum downstream traffic rate, from the OLT 12 to the ONUs $14_1$ to $14_5$, is equal to the maximum traffic rate at the wavelength $\lambda 1$ plus the maximum traffic rate at the wavelength $\lambda 2$. Assuming that the respective maximum traffic rates at $\lambda 1$ and $\lambda 2$ are equal to one another, the total downstream traffic capacity can be denoted as one unit (1U) with each wavelength $\lambda 1$ and $\lambda 2$ providing 0.5U capacity which is to be distributed between the five ONUs $14_1$ to $14_5$.

As indicated previously, the downstream traffic requirements of the different ONUs $14_1$ to $14_5$ vary with time. One example of such variation is shown in the table below which relates to two consecutive time frames TF1 and TF2.

TABLE

| ONU Traffic Demand (Fraction of total PON capacity) | | |
|---|---|---|
| | Time Frame | |
| | TF1 | TF2 |
| ONU1 | ¼ U | ¼ U |
| ONU2 | ⅛ U | 0U |
| ONU3 | ⅛ U | 0U |
| ONU4 | ¼ U | ½ U |
| ONU5 | ¼ U | ¼ U |

Table

As shown in the table, in the first time frame TF1 all of the ONUs require a part share of the overall downstream traffic capacity 1U, the ONUs $14_1$, $14_4$ and $14_5$ each requiring ¼ U of capacity and the ONUs $14_2$ and $14_3$ each requiring only ⅛ U capacity.

In the second time frame TF2 the capacity requirements are changed and the ONUs $14_2$ and $14_3$ no longer require any share of the overall downstream capacity. This therefore frees up a total of ¼ U of the PON capacity for the remaining ONUs $14_1$, $14_4$ and $14_5$. In this particular example the ONU $14_4$ is allocated this spare capacity and accordingly in time frame TF2 the ONU $14_4$ has ½ U capacity and the remaining two active ONUs $14_1$ and $14_5$ each continue to have ¼ U capacity.

As indicated by the above example, a communications network embodying the present invention is capable of dynamically allocating capacity (or bandwidth) to the different ONUs so as to take advantage of spare PON capacity. This spare capacity can be dedicated to one or more specific ONUs (as in the example above) or can be evenly distributed between all the ONUs.

The way in which such dynamic bandwidth allocation is achieved will now be discussed in detail with reference to FIGS. 3 to 5, all of which relate to use of the FIG. 2 network in the case of the exemplary traffic demand situation set out in the above table.

Figures 3A, 3B:
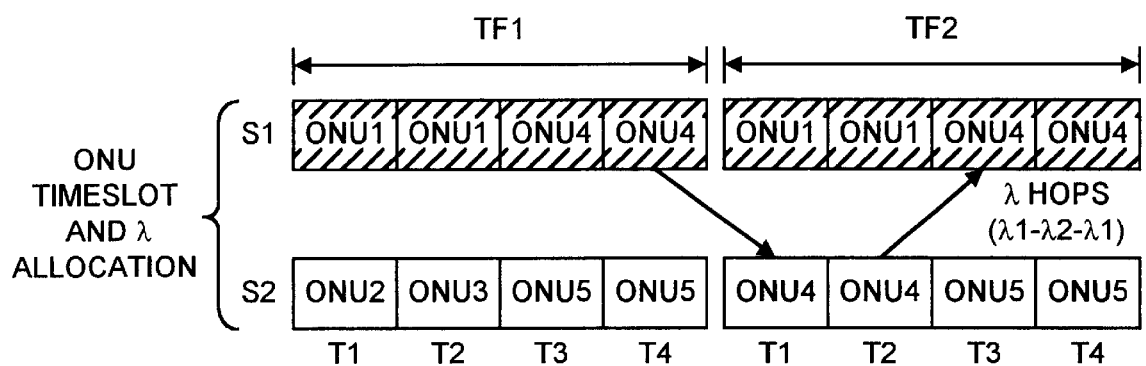
FIGS. 3 to 5 are diagrams for illustrating operation of the FIG. 2 network.

The traffic demand of each ONU in the two time frames TF1 and TF2 is repeated in FIG. 3(A) for ease of reference. FIG. 3(A) also shows, in conjunction with FIG. 3(B), how the ONUs are allocated shares of the total available bandwidth consistent with their respective traffic demands. In FIGS. 3 and 4, hatched portions denote allocation of the first wavelength $\lambda 1$ to an ONU, whereas non-hatched blocks represent allocation of the second wavelength $\lambda 2$ to an ONU.

Firstly, as shown in FIG. 3(B), each time frame TF is divided into four time slots T1 to T4. As there are two different optical signals S1 and S2, having respectively the wavelengths $\lambda 1$ and $\lambda 2$, each signal provides M U capacity. Each time slot T of one signal corresponds to ⅛ U capacity. Thus, in the first time frame TF1, the ONUs $14_1$, $14_4$ and $14_5$ each require two time slots and the ONUs $14_2$ and $14_3$ each require only one time slot. As shown in FIG. 3(B), in the first time frame TF1 the ONU $14_1$ is allocated the first and second time slots T1 and T2 of the optical signal S1 having the first wavelength $\lambda 1$, and ONUs $14_2$ and $14_3$ are allocated the first and second time slots T1 and T2 respectively of the optical signal S2 having the second wavelength $\lambda 2$. The third and fourth time slots T3 and T4 of the optical signal S1 having the first wavelength $\lambda 1$ are both allocated to the ONU $14_4$, and the third and fourth time slots T3 and T4 of the optical signal S2 having the second wavelength $\lambda 2$ are both allocated to the ONU $14_5$.

In the second time frame TF2 the allocations to the ONUs $14_1$ and $14_5$ are unchanged, but since the ONUs $14_2$ and $14_3$ no longer require any downstream traffic, spare downstream capacity becomes available which is allocated to the ONU $14_4$, enabling the ONU $14_4$ to have four time slots altogether within the time frame, equivalent to ½ U capacity. Initially, in time slots T1 and T2, the ONU $14_4$ receives data carried by the optical signal S2 having the second wavelength $\lambda 2$, but subsequently switches to receive data carried by the optical signal S1 having the first wavelength $\lambda 1$ in the final two time slots T3 and T4.

As will be apparent from FIGS. 3(A) and 3(B), the ONU $14_4$ changes from receiving data on the first-wavelength optical signal S1 at the end of the first time frame TF1 to receive data on the second-wavelength optical signal S2 in the first two time slots T1 and T2 of the second time frame TF2 and then changes back to the first-wavelength optical signal S1 to receive data from that signal again in the third and fourth time slots T3 and T4 of TF2. These changes may conveniently be referred to as wavelength hops.

Figure 4:
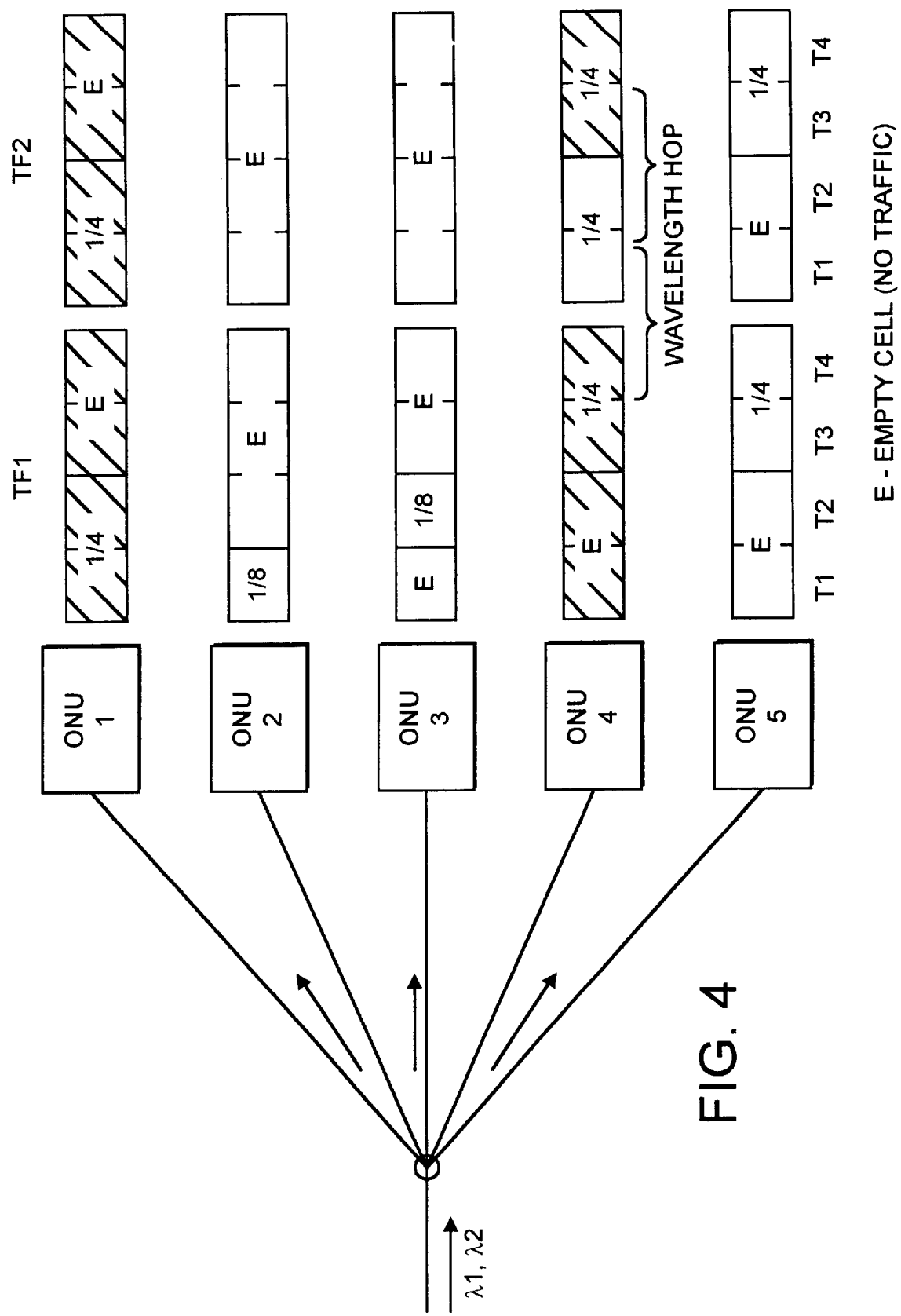
Figure 5:
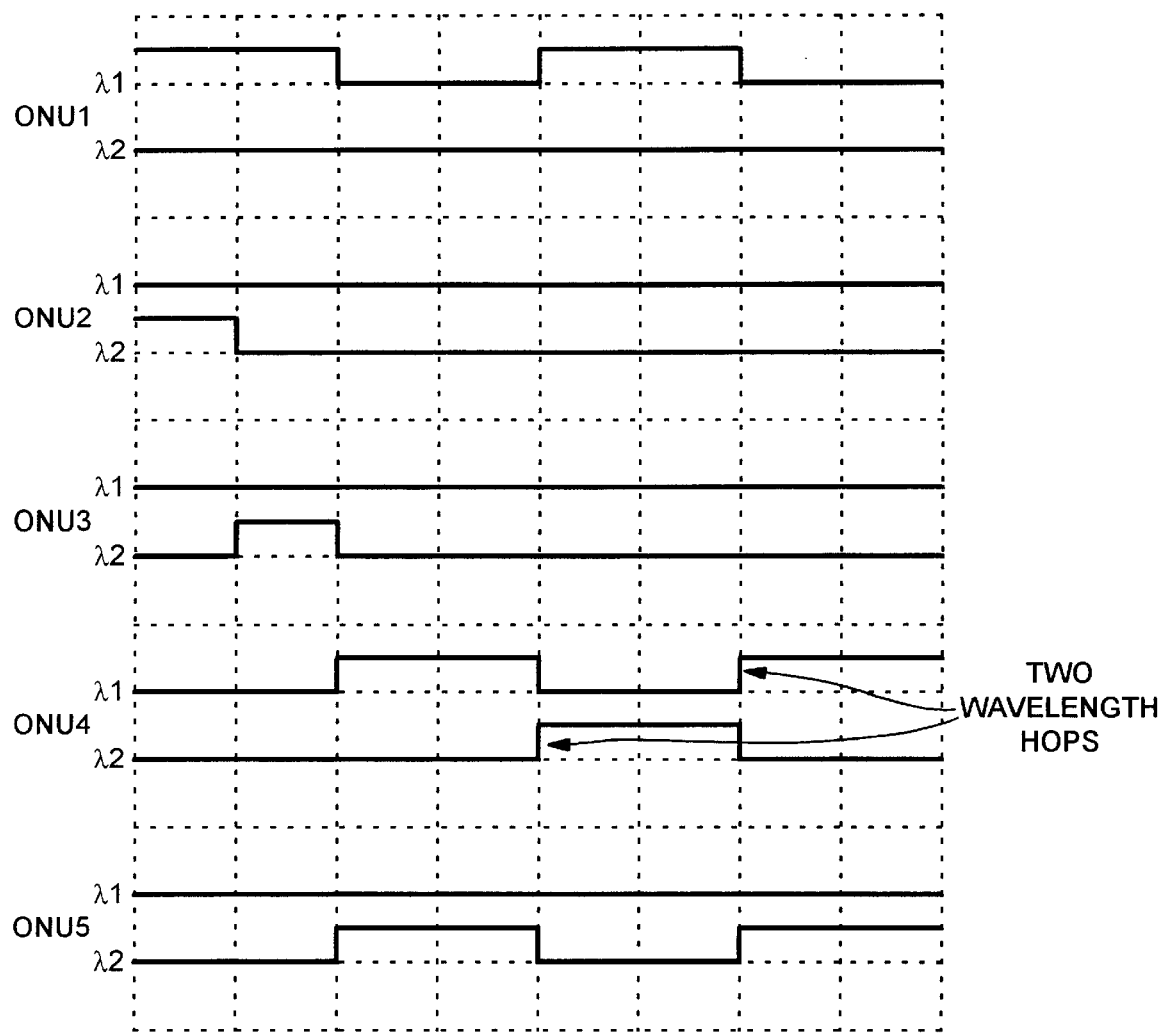

FIG. 4 shows the wavelength and time slot allocations in a slightly different way. Blocks labelled E denote time slots in which no traffic is received by the ONU concerned. In an ATM network, for example, the ONU would produce one or more empty cells in such time slots.

In order for a communications network embodying the invention to operate correctly it is necessary for each ONU to be able to select the wavelength on which the data destined for it is being transmitted by the OLT 12 in each time slot.

It is preferable, but not essential to the invention, for the ONU to use only a single detector for detection of any of the incoming wavelengths so as to keep the ONU design simple. Thus, each ONU will be required to tune to a single wavelength at a given time. The wavelength selections by each ONU (each having just a single detector) in the present example are shown in FIG. 5.

Incidentally, in any given time frame the maximum bandwidth allocation for a particular ONU is limited in the present example to ½ U. This ½ U capacity may be provided by selecting the same wavelength throughout the time frame, or, as in the case of the ONU $14_4$ in the present example, by selecting both wavelengths at different times and performing a wavelength hop.

It would be readily possible to design each ONU to receive data simultaneously on more than one wavelength, but in this case more than one detector would be required, increasing the cost and complexity of the ONU. When more than one detector is provided in an ONU, the share of the overall downstream traffic that can be allocated to that ONU is no longer limited to U divided by the total number of available wavelengths. In principle all of the downstream traffic on all available wavelengths in a particular time frame could be allocated to just a single ONU.

A conceivable design compromise would be to simply provide less detectors in each ONU than there are different available wavelengths; for example if there were sixteen different possible wavelengths, each ONU could be provided with four detectors enabling it to select up to four different wavelengths in each time slot. It is of course not necessary that each ONU have the same number of detectors.

The wavelength-division-multiplexed optical signals S1 and S2 produced by the OLT 12 in each time frame are broadcast to all of the connected ONUs via the downstream PON. Accordingly, in order to enable each ONU to receive the data destined for it, it is necessary for the OLT 12 to provide the ONUs with control information to enable them to select the appropriate wavelength in each time slot of the time frame concerned. This can be done in two basic ways. Firstly, it is possible to include the control information as overhead information in the broadcast transmitted signals themselves. This method is used in the first embodiment of the present invention. The second method is to use a separate optical signal as a signalling channel, as in the second embodiment of the present invention which will be considered later in the present specifications.

Figure 6:
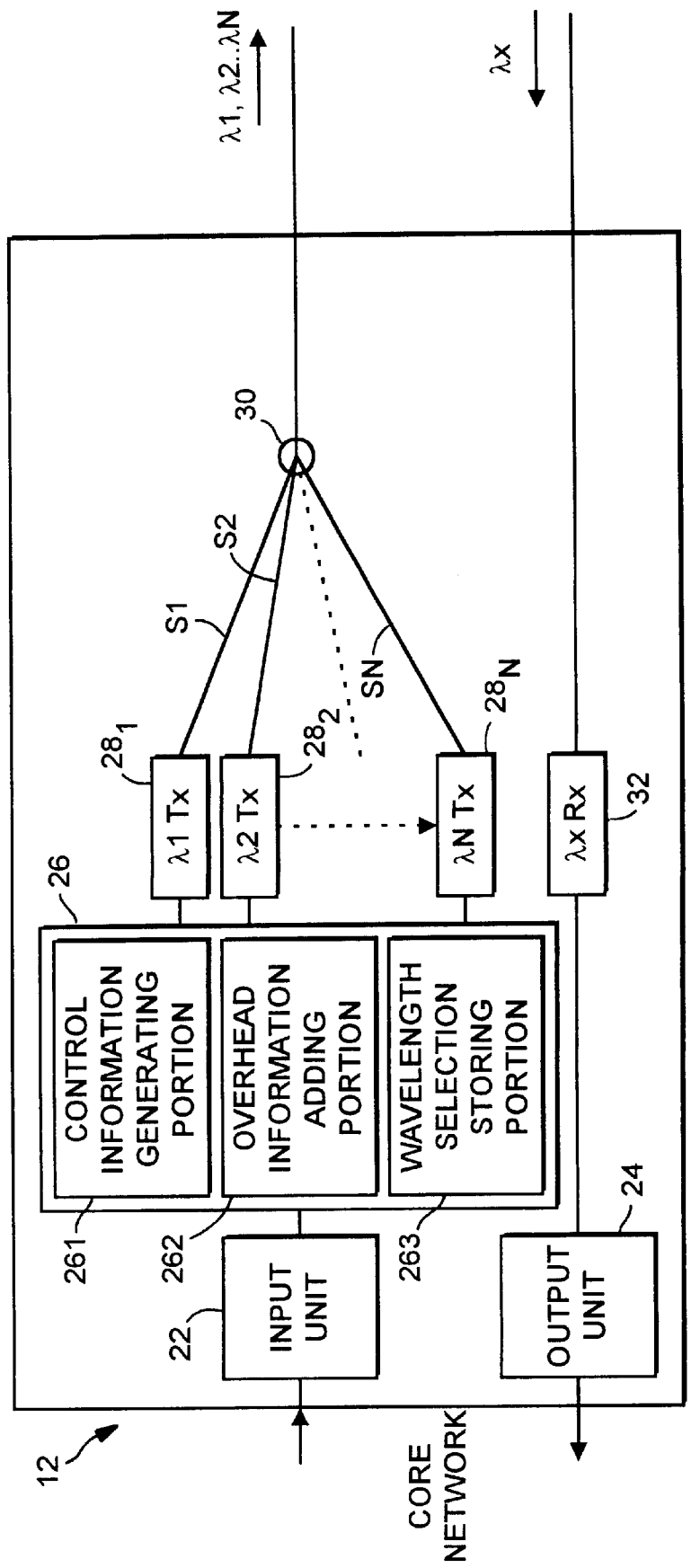
FIG. 6 shows a block diagram of an optical line termination unit for use in a first embodiment of the present invention.

FIG. 6 shows a block diagram of parts of an OLT used in a first embodiment of the present invention. The OLT 12 includes an input unit 22 for receiving data from the core network that is to be transmitted to the ONUs, an output unit 24 for outputting to the core network upstream traffic that has been received from the ONUs, a transmission control unit 26, and a plurality of transmitters $28_1$ to $28_N$. The transmission control unit 26 includes a control information generating portion 261, an overhead information adding portion 262, and (optionally) a wavelength selection storing portion 263. The transmitters correspond in number to the number N of different available downstream wavelengths λ1 to λN, each transmitter serving to generate an optical signal Si having a different one of those available wavelengths λi.

The OLT 12 further includes a wavelength-division-multiplexing (WDM) combiner unit 30 coupled to each of the transmitters $28_1$ to $28_N$ for combining the respective optical signals S1 to SN produced thereby, and an optical receiver 32 for receiving an upstream optical signal having the wavelength λx and carrying upstream traffic from the ONUs in a predetermined TDMA format. In the FIG. 6 example, the PON 6 is of the two-fibre type, and so the WDM combiner unit 30 is connected to a downstream PON and the optical receiver 32 is connected to a upstream PON separate from the downstream PON.

In use of the OLT 12 of FIG. 6, traffic from the core network that is to be transmitted by the OLT to the ONUs is received at the input unit 22 and passed to the transmission control unit 26.

If the core network is an ATM network, for example, the data will be received in the form of ATM cells, each having 53 bytes in total, of which the first five bytes constitute a header portion including control and addressing information specific to the cell, and the final 48 bytes constitute a payload portion for carrying the data of the cell.

The control unit 26 examines the data received from the core network, e.g. the header portion of each ATM cell, to determine to which ONU it is to be sent. Based on the amount of data to be sent to each ONU in each time frame the control unit 26 then determines the allocation of wavelengths and time slots to the different ONUs in the time frame concerned. The control unit 26 then causes data items (e.g. ATM cells) to be applied to the different transmitters $28_1$ to $28_N$ in the appropriate time slots of the time frame concerned to implement the determined allocations. In the control unit 26 of this embodiment the control information generating portion 261 generates control information for notifying the ONUs of their wavelength and time slot allocations, and the overhead information adding portion 262 adds the control information as overhead information to the data-carrying optical signals S1 to SN, as described later in more detail with reference to FIGS. 8 to 14.

The respective optical signals S1 to SN at the different wavelengths λ1 to λN are then combined in the WDM combiner unit 30 and output in wavelength-division multiplexed form from the OLT 12 to the downstream PON.

On the upstream side, the upstream signal carrying upstream data from the ONUs is processed by the optical receiver 32 to extract the data therefrom and the data is passed to the output unit 24 for delivery to the core network.

Figure 7:
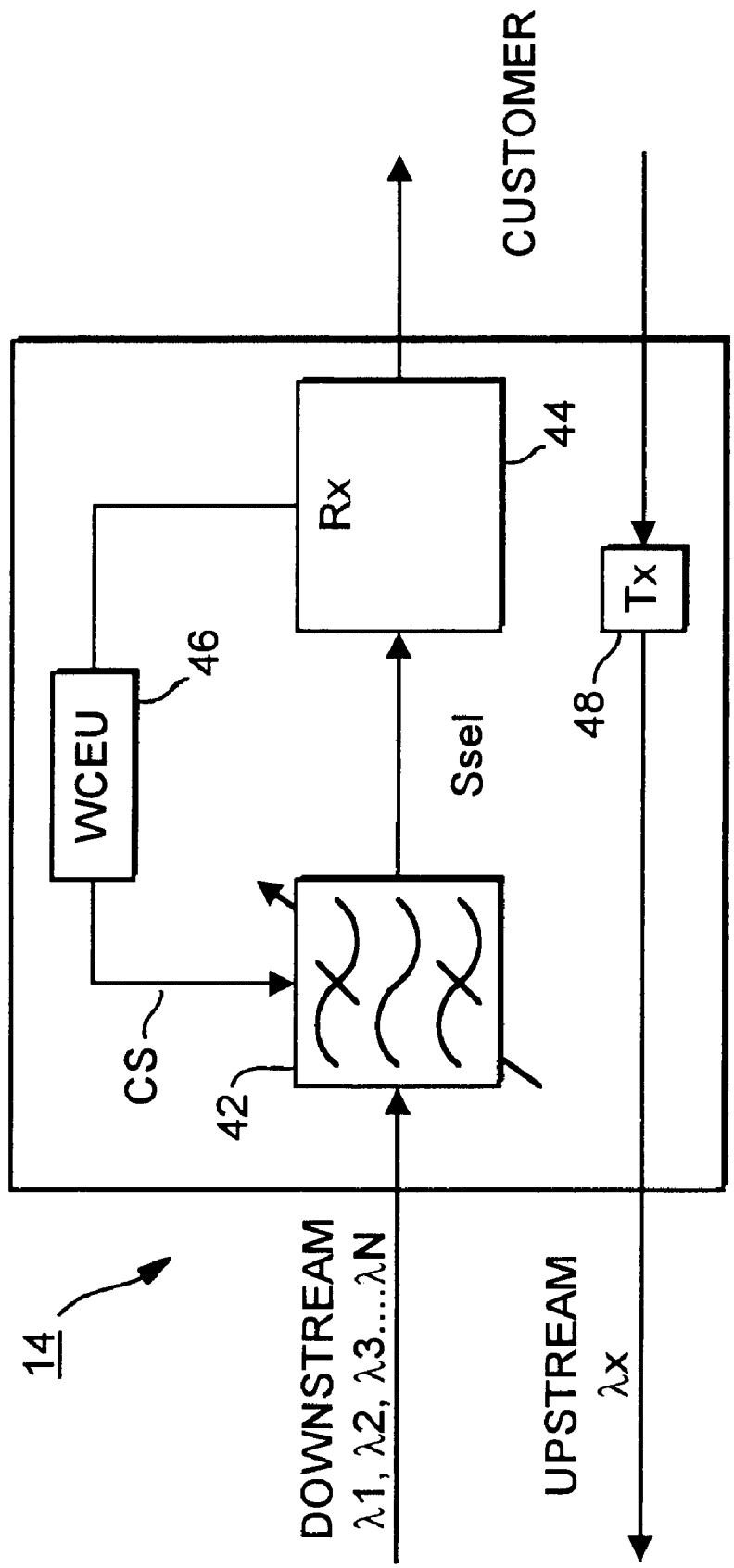
FIG. 7 shows a block diagram of an optical network unit for use in the first embodiment.

FIG. 7 shows a block diagram of an ONU 14 for use in the first embodiment. The ONU 14 includes a tunable filter 42 connected to the downstream PON for receiving the wavelength-division multiplexed optical signals S1 to SN, an optical receiver 44, a wavelength control extraction unit (WCEU) 46, and a transmitter 48 connected to the upstream PON for delivering thereto upstream data received from the customer.

In use of the ONU 14 the wavelength-division-multiplexed optical signals S1 to SN produced by the OLT 12 are received by the tunable filter 42 which, based on a control signal CS applied thereto by the WCEU 46 specifying one of the downstream wavelengths λ1 to λn, selects the optical signal Ssel having the specified wavelength and passes it to the optical receiver 44 which processes the selected optical signal Ssel to extract therefrom the data and any overhead information carried by that signal. The data extracted from the selected optical signal Ssel is output from the ONU 14 to the customer. Any overhead information is passed by the optical receiver 44 to the WCEU 46. The WCEU 46 processes the overhead information, extracts from it any control information relevant to its ONU, and generates in dependence upon the relevant control information the control signal CS applied to the tunable filter 42.

Data from the customer for transmission to the core network is received by the transmitter 48 in the ONU 14 and transmitted, at time slots determined by the TDMA format of the upstream traffic, to the OLT 12 at the single wavelength λx using the upstream PON.

In the first embodiment, the control information needed by the ONU may be included as overhead information in the wavelength-division-multiplexed optical signals in a number of different ways, as will now be described with reference to FIGS. 8 to 14. In the examples of FIGS. 8 to 14 the data is transmitted in the form of ATM cells, one cell per time slot T1 to T4, but this of course is not essential to the invention.

Figure 8:
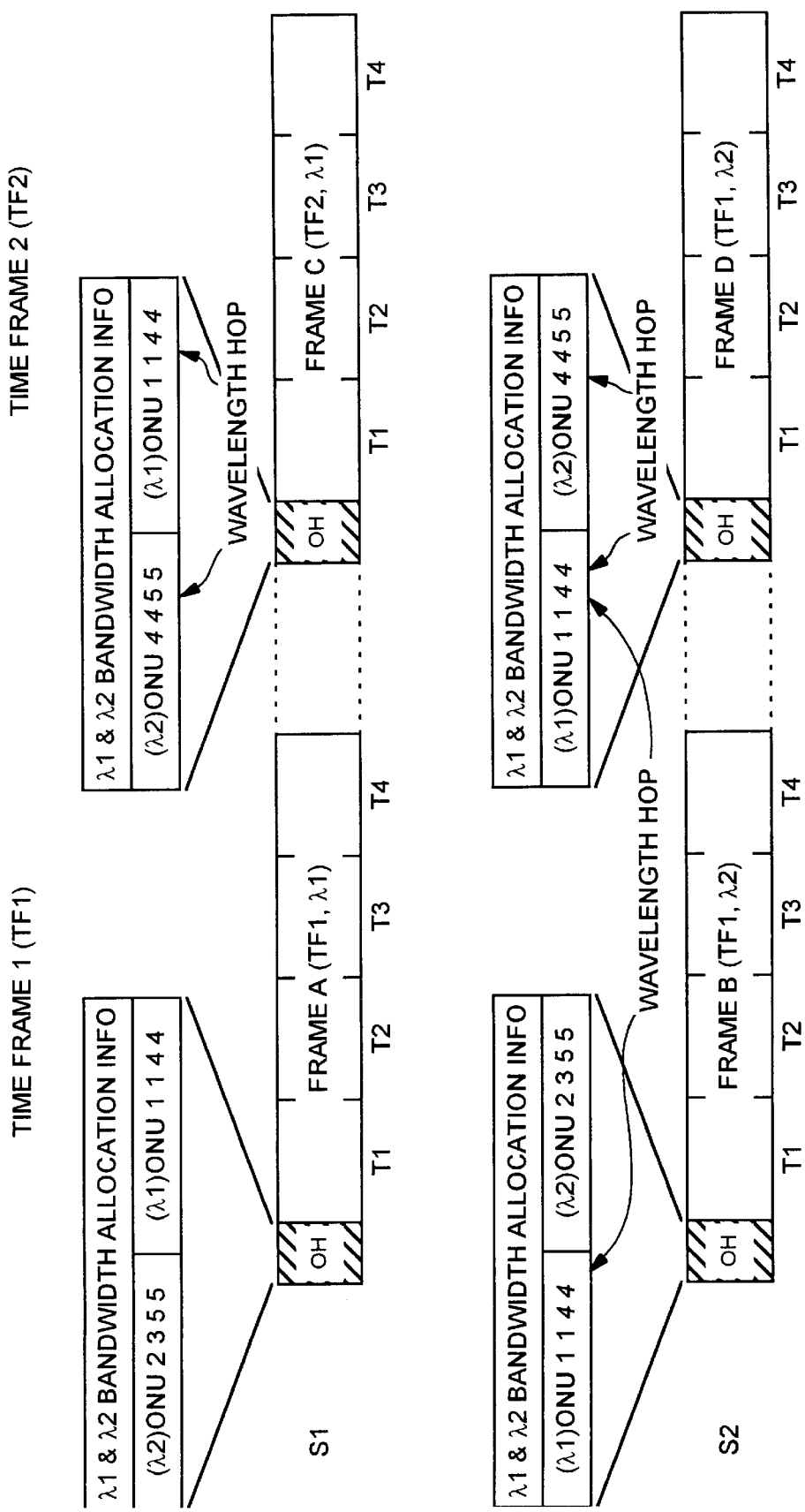
FIG. 8 shows a diagram for explaining a first technique for transmitting control information in a communications network embodying the invention.

In FIG. 8 the four ATM cells to be transmitted on each optical signal S1 or S2 in the four time slots T1 to T4 of each time frame are framed, and additional overhead information (OH), providing the control information for each time slot of the frame, is added at the head of the frame. The control information is divided into two OH fields, one for each different wavelength, and each OH field identifies the ONUs which must select that wavelength in each successive time slot T1 to T4. This control information is transmitted on all of the wavelengths so that all of the ONUs have access to all of the control information.

In time frame TF1, frame A is transmitted by the optical signal S1 having the first wavelength λ1 and frame B is transmitted simultaneously by the optical signal S2 having the second wavelength λ2. For each optical signal, the second OH field contains the ONU allocation information for the signal's own wavelength (λ1 for S1, λ2 for S2) while the first OH field contains the ONU allocation information for the other wavelength (λ2 for S1, λ1 for S2). Each field has four entries corresponding respectively to the four time slots T1 to T4 of the time frame. Each entry is an ONU designation number designating one of the ONUs; each of the ONUs 14 has its own unique ONU designation number, e.g. "2" for the ONU $14_2$.

Thus, the first OH field in frame A is the same as the second OH field of frame B and specifies that the cells in time slots T1 to T4 of frame B are destined for the ONUs $14_2$, $14_3$, $14_5$ and $14_5$ respectively.

The second OH field of frame A is the same as the first OH field of frame B and specifies that the cells in time slots T1 to T4 of frame A are destined for the ONUs $14_1$, $14_1$, $14_4$ and $14_4$ respectively.

Frames C and D are transmitted simultaneously in time frame TF2 by the optical signals S1 and S2 respectively. Again, the first OH field in frame C relates to cells transmitted in frame D, and the first OH field in frame D relates to cells transmitted in frame C.

When each ONU receives overhead information in the optical signal to which it is currently tuned, the overhead information is passed to the WCEU 46 (FIG. 7) which examines each OH field in order. If it finds, in an OH field, its own ONU designation number it determines that its ONU must tune in the relevant time slot to the optical signal whose wavelength corresponds to that field. The control signal CS applied to the tunable filter 42 by the WCEU 46 is then changed at the time slot concerned to effect the necessary retuning. For example, the ONU $14_4$ is tuned to S1 in time slots T3 and T4 of the frame A. On receiving the first OH field of frame C on S1, the WCEU 46 in the ONU $14_4$ determines that the following cells destined for the ONU $14_4$ will be arriving on S2 in time slots T1 and T2 of frame D and therefore at the start of T1 retunes its optical filter 42 for detection at the wavelength $\lambda 2$. Further, on receiving the second OH field of frame C on S1, the WCEU 46 in the ONU $14_4$ determines that further cells destined for the ONU $14_4$ will be arriving on S1 in time slots T3 and T4 of frame C and therefore determines in advance that it is to retune at the start of T3 to detect at $\lambda 1$ again.

It is because of the possibility that an ONU will have to retune for receipt of the cell in the first time slot T1 of a frame (such as the time slot T1 of frame D in the case of the ONU $14_4$) that the first OH field carried by each frame relates to the other wavelength. The arrival at an ONU of the other-wavelength ONU allocation information before the "home-wavelength" ONU allocation information gives more time for such retuning. It will be appreciated, however, that it is not essential for the other-wavelength ONU allocation information to be transmitted first. For example, the control information could have the same format in each frame with the allocation information for $\lambda 1$ appearing in every first OH field and the allocation information for $\lambda 2$ appearing in every second OH field. In this case, however, it might be necessary to provide a guard band between the second OH field and the first time slot T1 to allow time for retuning. Indeed, in some cases it is envisaged that it might be prudent to provide a guard band before the start of each time slot T1 to T4 in the transmitted frames to allow for retuning time.

The control information relating to a particular frame of cells does not necessarily have to be attached to the frame containing those cells. For example, the control information could arrive several frames ahead of the cells that it is related to. This would provide each ONU with advance tuning information. However, this technique would require buffering of the control information at each ONU.

Although as described above, a single ATM cell is transmitted in each time slot of each frame, it will be appreciated that two or more cells destined for the same ONU could be transmitted in each time slot.

Another technique for transmitting the control information to the ONUs, described below with reference to FIG. 9, employs the ATM cell addressing information (virtual channel identifier (VCI) and virtual path identifier (VPI) bytes of the header portion of each cell) to control the ONU wavelength selection, instead of using specially-generated ONU designation numbers as in the FIG. 8 technique. Each ONU recognises those ATM cells which are destined for it on the basis of the addressing information (VCI and VPI bytes) carried by each cell. Thus, the VPI and VCI bytes effectively identify the ONU to which the cell is to be sent.

Figure 9:
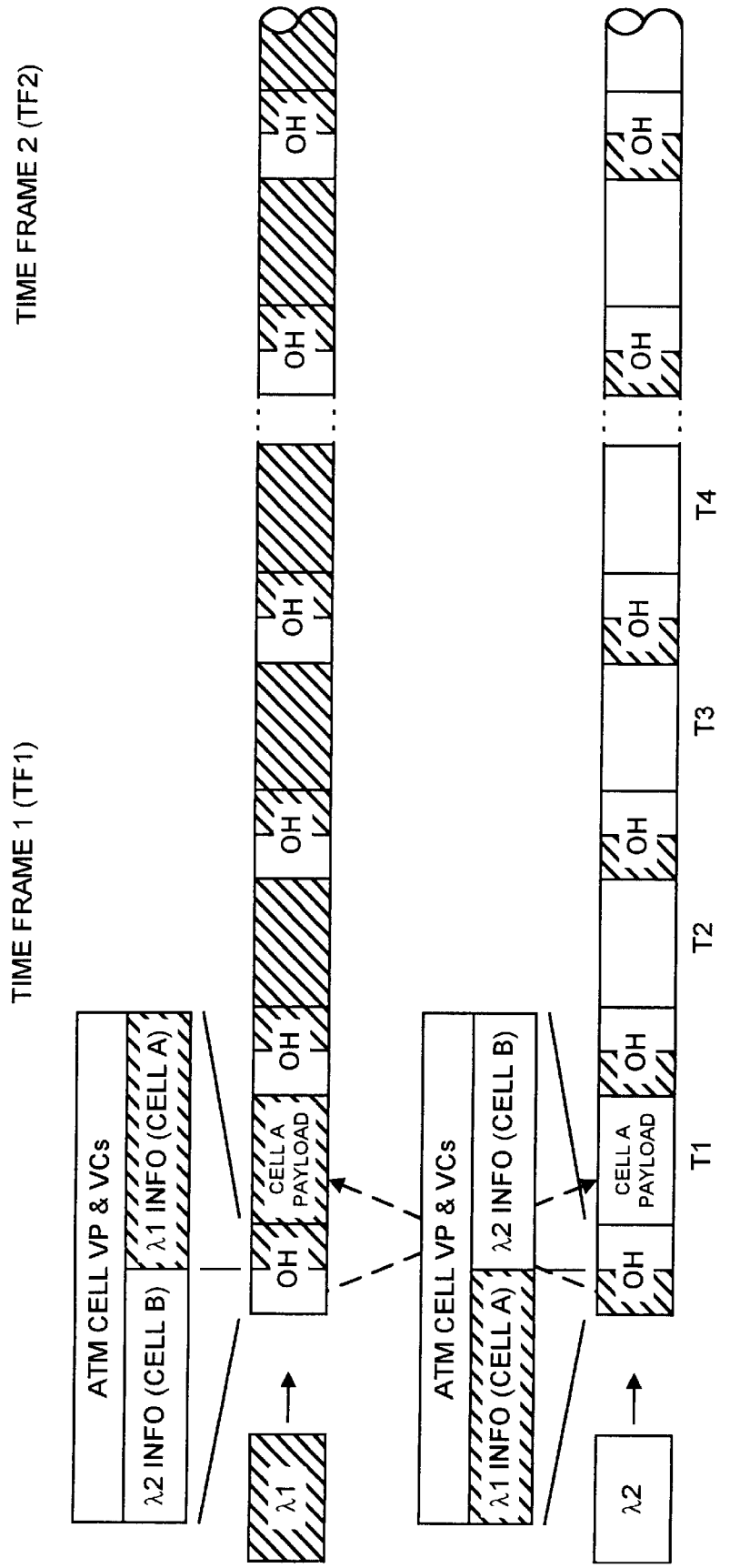
FIG. 9 shows a second such technique.

As shown in FIG. 9, the different optical signals transmit respective cell payloads simultaneously in each time slot, e.g. payloads of cells A and B in the time slot T1 of time frame TF1. Each cell payload has associated with it control information (cell OH) which is transmitted immediately before the cell payload. The control information is made up of the ATM cell VPI and VCI information for each cell transported on every wavelength within the same time slot. The cell OH is therefore divided into N OH fields, where N is the number of different wavelengths, and each OH field will contain the VPI and VCI information for one of the cells transmitted in the time slot concerned. In the present example, there are only two wavelengths $\lambda 1$ and $\lambda 2$ and therefore the cell OH is divided into first and second OH fields.

The first OH field transported on S1 contains the VPI and VCI address information for the cell B whose payload will be arriving on S2 in the same time slot as the payload of cell A arrives on S1, and the second OH field transported on S1 contains the VPI and VCI information for the cell A. Thus, if the WCEU 46 in an ONU detects, in either OH field, VPI and VCI address information which matches address information held by the ONU, the WCEU 46 can tell, from the position (field) in which the matching VPI and VCI address information appears within the cell OH, which wavelength the cell concerned will be arriving on.

For example, if a cell is addressed to the ONU $14_4$ on $\lambda 2$ in a particular time slot, then the VPI and VCI information for this cell will be inserted into the first OH field of the cell OH transmitted immediately before that time slot on $\lambda 1$ and into the second OH field of the cell OH transmitted on $\lambda 2$. If the ONU $14_4$ is currently tuned to $\lambda 1$, then as soon as the WCEU 46 in the ONU $14_4$ detects the VPI and VCI information in the first OH field of the cell OH received on $\lambda 1$ it knows that it must retune to $\lambda 2$ to detect the cell payload in this time slot.

As in the technique described previously with reference to FIG. 8, the field order in the cell OH is different for the different wavelength optical signals S1 and S2 so that the first field of each signal that is received relates to the other-wavelength signal. However, as before, this feature is not essential and the field format could be the same for all wavelengths, for example by the use of guard bands.

The FIG. 9 technique is advantageous, particularly when there are only a small number of wavelengths, because the required control information already exists, namely the VPI and VCI address information. Thus, no additional information needs to be generated using this technique.

Furthermore the control information is per cell in this technique, as opposed to per frame in the FIG. 8 technique. Thus there is already a built-in guard band between successive cells.

As in the FIG. 8 technique, the control (cell OH) information relating to a particular cell payload does not necessarily have to be transmitted immediately before that cell payload. For example, the control information could arrive several time slots ahead of the cell payload to which it relates. This will provide the ONU with advance tuning information but will require buffering of the control information at the ONU.

Figure 10:
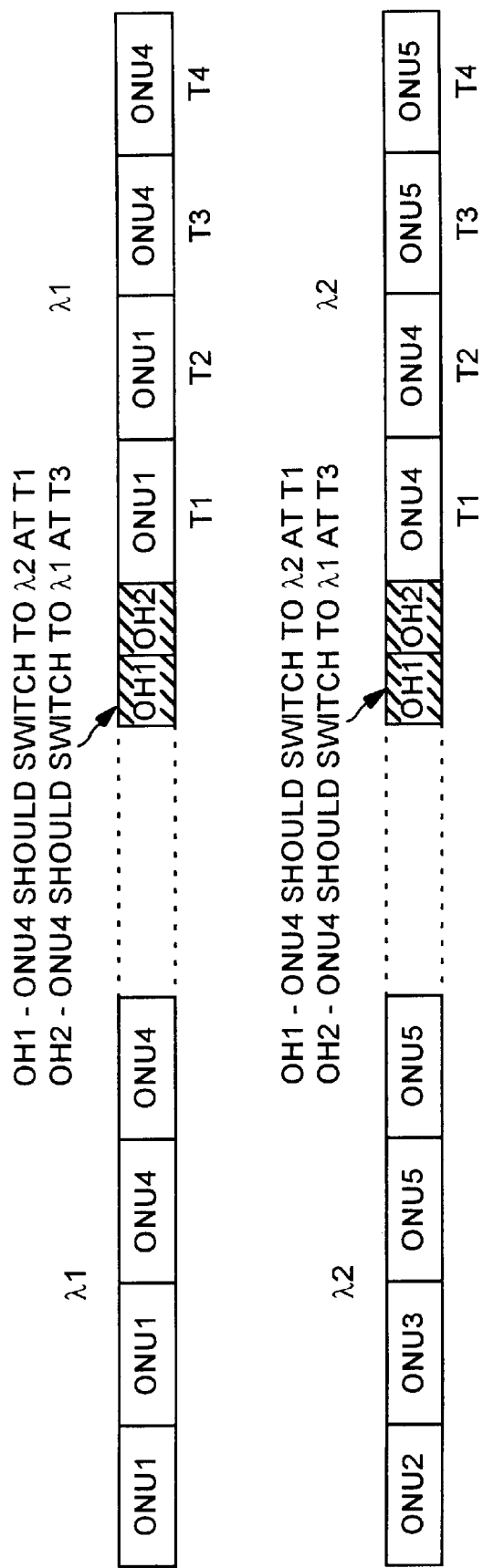
FIG. 10 shows a third such technique.

Another technique for transporting the control information from the OLT to ONUs, shown in FIG. 10, involves transmitting only the information relating to the wavelength hops. An OH block, containing control information, is generated and added to a frame of cells only when a particular ONU needs to select a different wavelength. As shown in FIG. 10, two OH blocks OH1 and OH2 have been added to each of the frames transmitted in time frame TF2 as the ONU $14_4$ has to change its wavelength selection twice, from $\lambda 1$ as used in the time frame TF1 to $\lambda 2$ in TF2 for the cells in time slots T1 and T2 and then has to change from $\lambda 2$ back to $\lambda 1$ for the cells in time slots T3 and T4 of TF2. OH1 specifies that the ONU $14_4$ should switch to $\lambda 2$ at T1 (of TF2) and OH2 specifies that the ONU $14_4$ should switch to $\lambda 1$ at T3.

Figure 11:
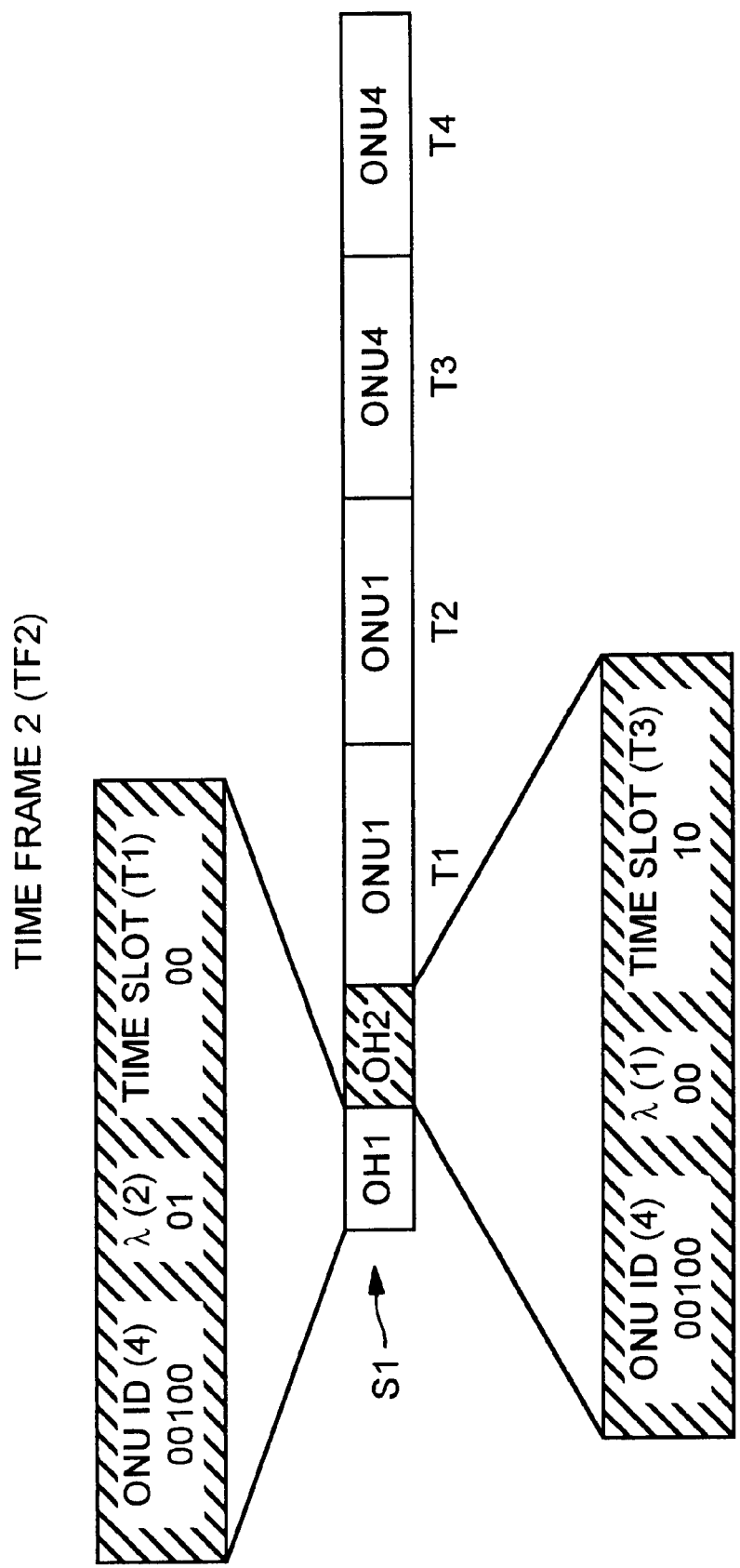
FIG. 11 shows details of a transmission format used in the third technique.

FIG. 11 shows one example of the format of each block OH1 or OH2 of control information in FIG. 10. Each block need only contain the ONU designation number (when adopting a frame structure approach), the wavelength that the ONU should be retuning to, and the time slot within the frame at which it should retune. If there were 32 ONUs, 4 transmission wavelengths and a frame structure of 4 cells, then a 9 bit code would be adequate to convey all the necessary information. The first field (5 bits) is an ONU ID field, the second field (two bits) is a wavelength field, and the third field is time slot field (two bits).

A format such as that shown in FIG. 11 can also be used in the FIG. 9 technique, although in this case the ONU ID field will not be required in the overhead block as the ONU designation information will be provided by the ATM cell header itself (VPI and VCI bytes).

Figure 12:
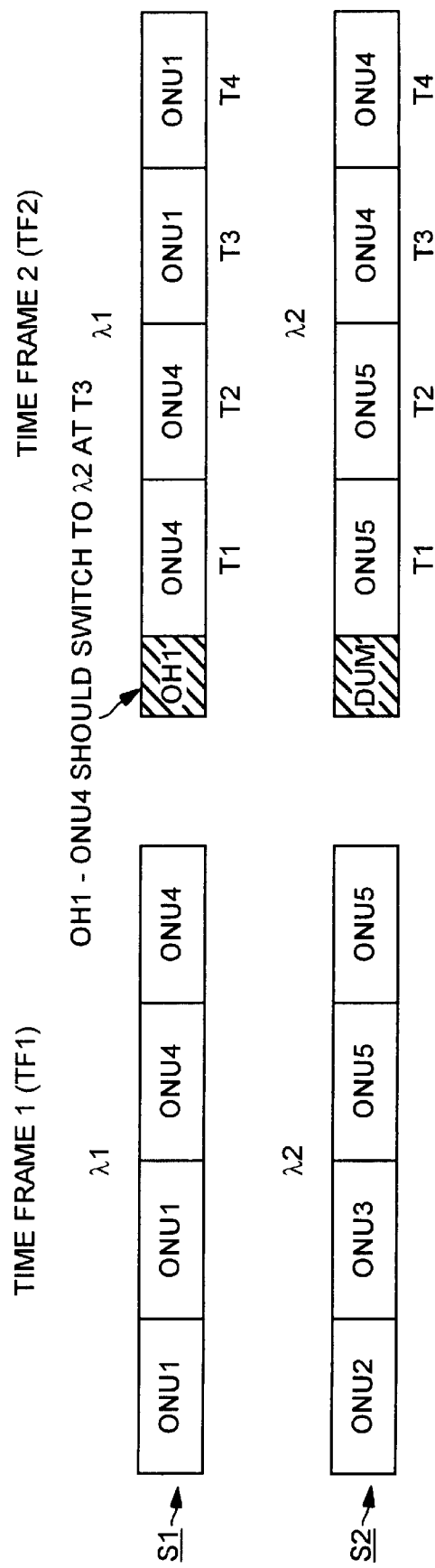
FIG. 12 shows an improvement to the third technique.

In the FIG. 10 technique, in which only wavelength hops are indicated, it is preferable that the number of hops be kept as low as possible in order to minimise the amount of overhead information required. In the example of FIGS. 3 to 5 the ONU $14_4$ is required to wavelength hop twice in time frame TF2, making it necessary to send two blocks of overhead information OH1 and OH2 in FIG. 10. By re-shuffling the ONU allocations it may be possible to reduce the number of wavelength hops required. For example, as shown in FIG. 12, if the ONU allocations at the end of time frame TF1 are maintained for time slots T1 and T2 of the time frame TF2, no wavelength hop at the beginning of TF2 is required. Only a single wavelength hop, by the ONU $14_4$, is required at time slot T3 in TF2 in which it switches from receiving on λ1 to receiving on λ2 in the final two time slots T3 and T4 of TF2.

In FIG. 12 the overhead block OH1 is not broadcast on both wavelengths. In this case it is sufficient for the block OH1 to be sent just on the optical signal S1 since OH1 relates exclusively to the ONU $14_4$ which, at the beginning of time frame TF2, is tuned to λ1. In place of the overhead block OH1 on λ2 in TF2 a dummy block DUM is transmitted to preserve synchronisation between the frames on S1 and S2. As the frames transmitted on λ1 and λ2 are synchronised, however, omitting the overhead block OH1 from the frame transmitted on λ2 in time frame TF2 does not increase the throughput of data.

However, some increase in data throughput can be achieved by utilizing the fact that, within each time frame, different control information can be included in the frames transmitted simultaneously on the different wavelengths. Consider, for example, the wavelength allocation situation shown in FIG. 13. Here, the allocations in time frame TF1 are the same as in FIG. 12, but in the time frame TF2 the allocations are 1 1 5 5 in the case of λ1 and 4 4 4 4 in the case of λ2. In this case, the overhead block OH1 transmitted on λ1 specifies that the ONU $14_4$ should switch to λ2 at T1 of the time frame TF2, and a different overhead block OH2, transmitted on λ2 at the same time as the overhead block OH1 on λ1, specifies that the ONU $14_5$ (which at this time is tuned to λ2) should switch to λ1 at time slot T3 of time frame TF2. When the control information is not broadcast, as in the example of FIG. 13, the transmission control unit 26 in the OLT requires the wavelength selection storing portion 263 (FIG. 6) which stores the current wavelength selection of each ONU so as to enable the wavelength control information to be sent only on the wavelength to which a particular ONU that has to select a different wavelength is currently tuned. This enables the transmission of excess overhead information on all the wavelengths to be avoided and hence improves capacity utilisation.

Figure 13:
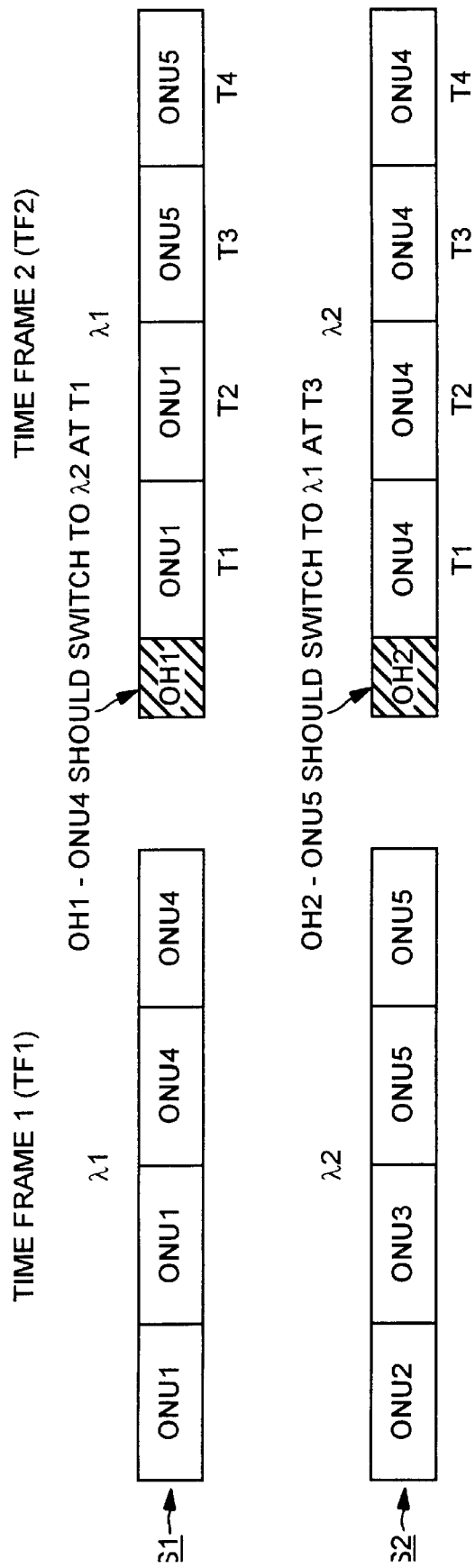
FIG. 13 shows a fourth technique for transmitting control information in a communications network embodying the present invention.

The overhead blocks OH1 and OH2 in FIG. 13 may be of the same format as shown in FIG. 11 for example.

Figure 14:
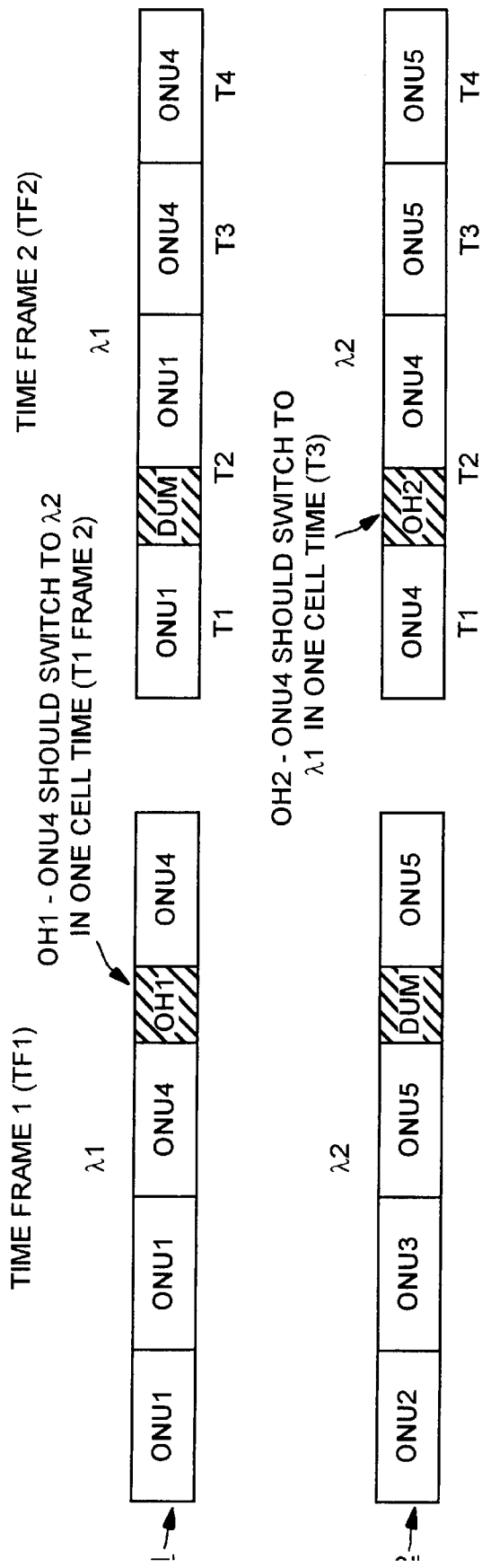
FIG. 14 shows a variation on the first to fourth techniques.

In the above examples, the overhead information was included exclusively at the head of the frame. However, the overhead information can alternatively be included between two time slots of a frame. For example, as shown in FIG. 14, overhead blocks OH1 and OH2, the same as in FIG. 10 and 11, have been inserted between time slots of the frames to provide the ONUs with advance wavelength hop information one cell prior to each required hop. As in FIG. 12, dummy blocks DUM are inserted simultaneously with the overhead blocks OH1 and OH2 to preserve synchronisation between the optical signals S1 and S2. A guard band may be necessary between time slots to allow sufficient time for retuning of the receivers.

Figure 15:
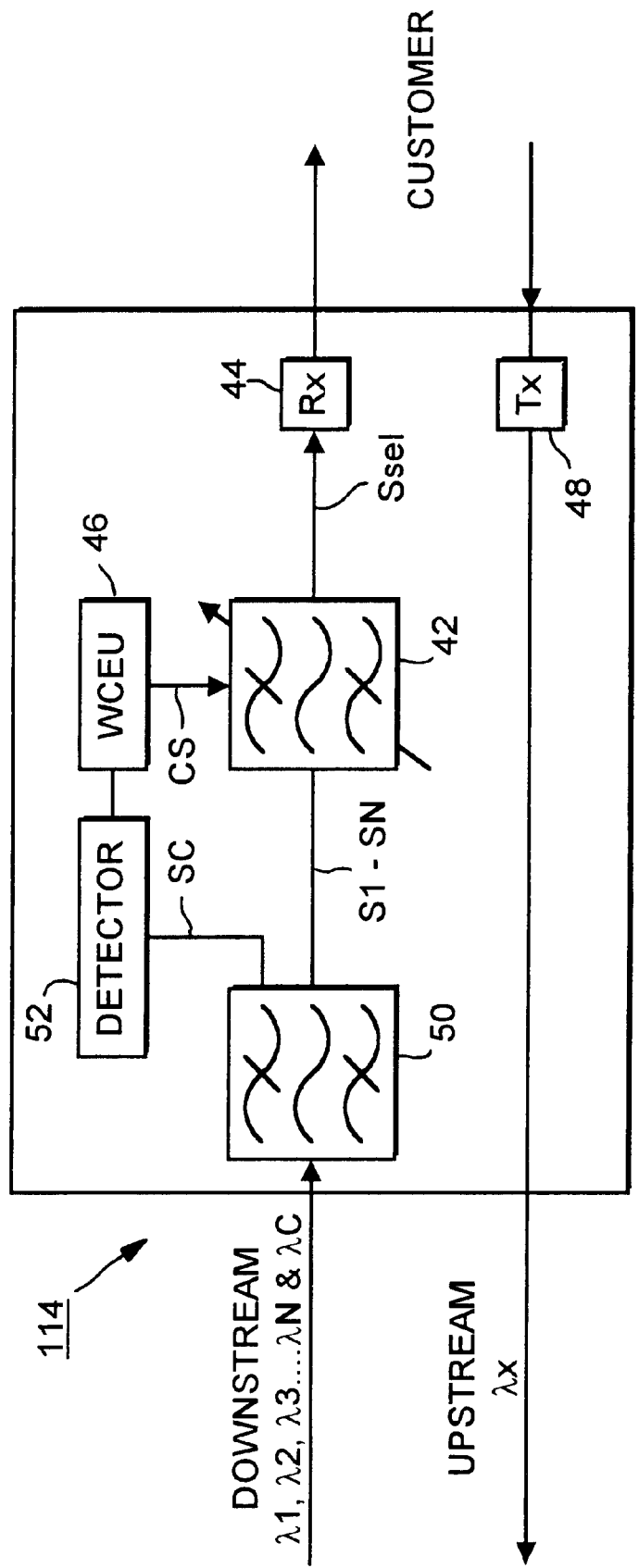
FIG. 15 shows a block diagram of an optical line techniques.

In the first embodiment, the control information was transmitted to the ONUs by the OLT as overhead information in the optical signals used for transmitting actual data. It is also possible, however, to use a separate signalling optical signal SC having its own dedicated wavelength λC to convey the control information. This approach is used in the second embodiment of the invention, and an OLT 112 and an ONU 114 suitable for use in the second embodiment are respectively shown in block form in FIGS. 15 and 16. The OLT 112 of FIG. 15 is of similar construction of the OLT 12 of FIG. 6 (first embodiment) but further includes an additional transmitter 28C which generates the signalling optical signal SC in dependence upon the wavelength control information supplied thereto by the control information generating portion 261 of the transmission control unit 26. In this case all of the wavelength control information is supplied exclusively to the transmitter $28_C$ and the other transmitters $28_1$ to $28_N$ accordingly do not carry any wavelength control information, so permitting data throughput to be increased. The overhead information adding portion 262 used in the first embodiment is accordingly not required. The signalling optical signal SC generated by the transmitter $28_C$ is applied to the WDM combiner unit 30 and wavelength-division-multiplexed with the data- carrying optical signals S1 to SN generated by the transmitters $28_1$ to $28_N$.

The ONU 114 of FIG. 15 is also of similar construction to the ONU 14 of FIG. 7 (first embodiment) and employs the tunable filter 42, receiver 44, wavelength control extraction unit (WCEU) 46 and transmitter 48 of the FIG. 7 ONU. Accordingly an explanation of these elements is omitted. The ONU 114 of FIG. 16 further includes a fixed-wavelength (non-tunable) optical filter 50 which separates out from the data-carrying optical signals S1 to SN the signalling optical signal SC and passes it to a detector 52 which detects the control information carried by the signalling optical SC. The filter 50 may be a low-, high- or band-pass filter depending on the position, in terms of wavelength, of the signalling optical signal SC in relation to the data-carrying optical signals S1 to SN. The detected control information is passed to the WCEU 46 which processes the control information to extract therefrom any control information relevant to its ONU and generate the necessary control signal CS to tune the tunable filter 42 to select the appropriate incoming wavelength λ1 to λN.

Figure 17:
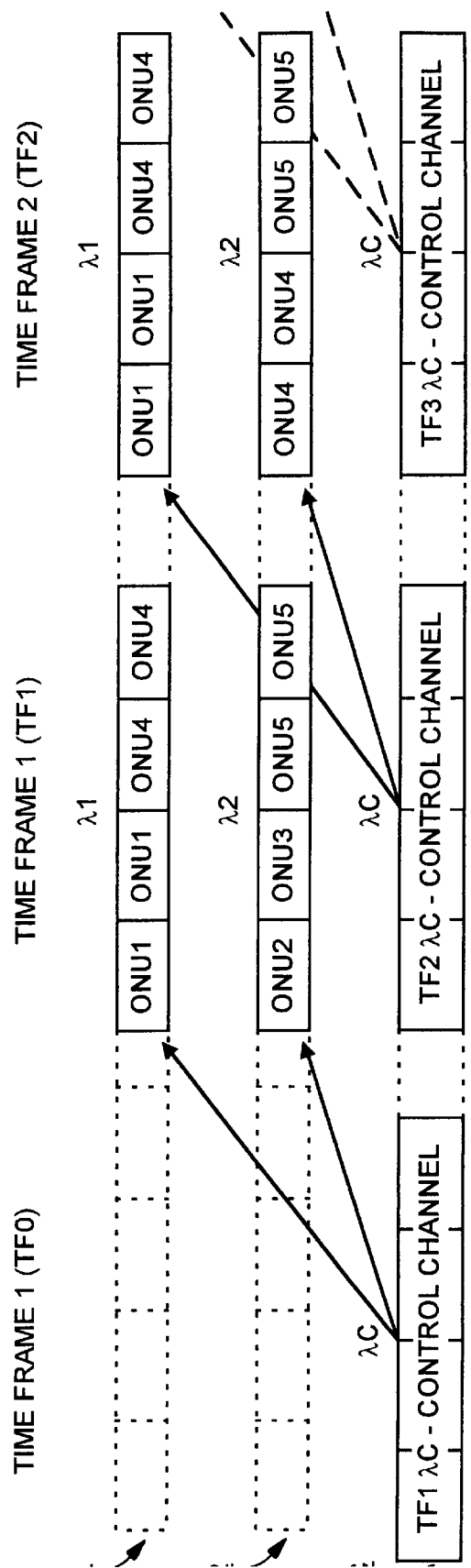
FIG. 17 is a diagram for illustrating operation of the second embodiment.

FIG. 17 shows an example of the data and control information sent on the optical signals S1, S2 and SC in the second embodiment. The control information, transmitted on the signalling optical signal SC, stream on the data-carrying optical signals S1 and S2 can be continuous and requires no additional framing.

Figure 18:
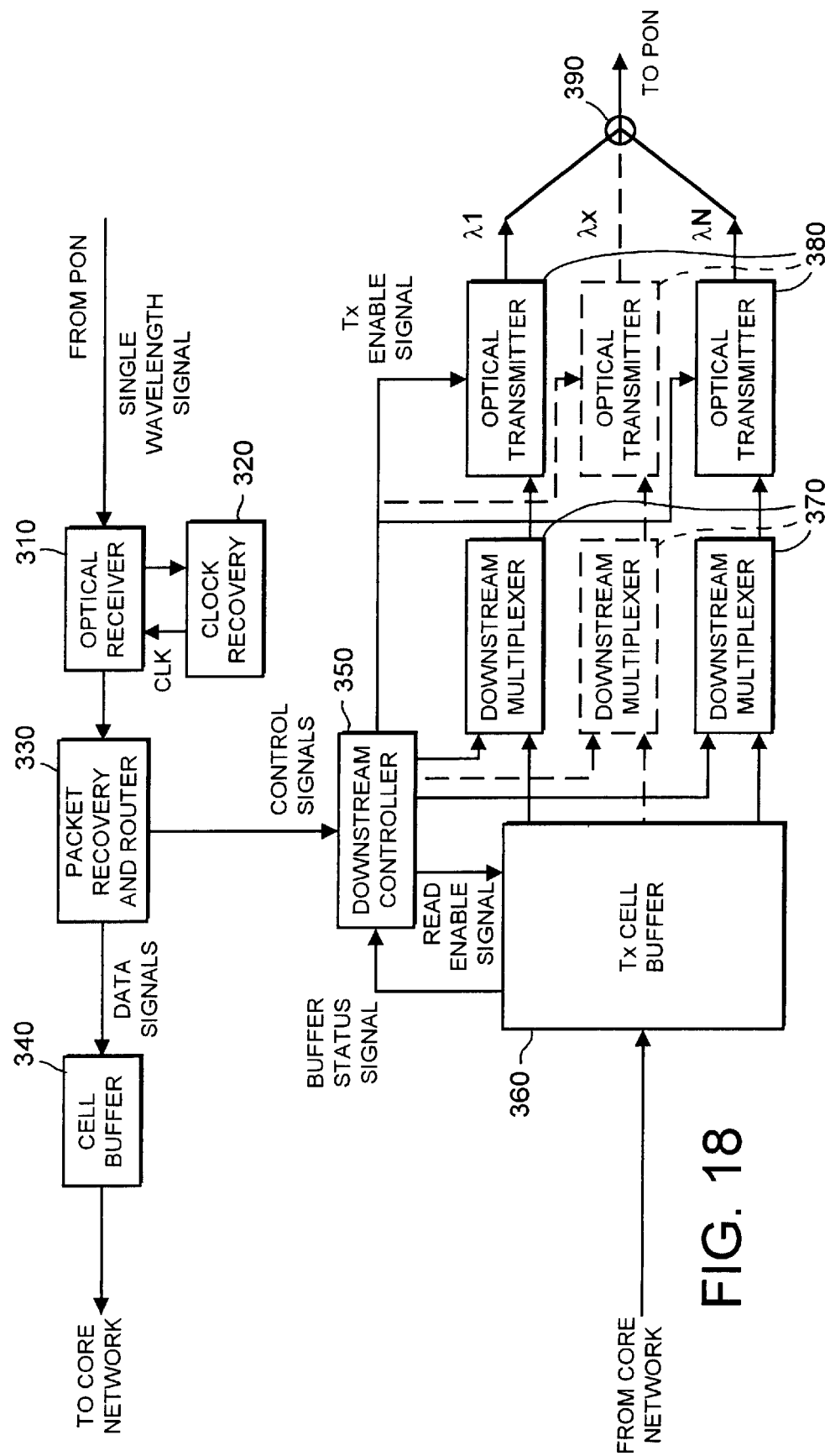
FIG. 18 is a detailed block diagram of parts of an optical line termination unit embodying the present invention.

FIG. 18 shows, in more detail than FIG. 6 or FIG. 15, parts of an OLT embodying the present invention.

The OLT 300 includes, on the receive side, an optical receiver 310, a clock recovery circuit 320, a packet recovery and router circuit 330 and a cell buffer 340.

The optical receiver 310 converts an upstream optical signal, carrying upstream traffic from the ONUs in a predetermined TDMA format, into a clocked electrical signal, as follows. Firstly, using a PIN photodiode or avalanche photodiode (APD) the upstream optical signal is converted into an electrical signal. This signal is then amplified. A copy of the electrical signal is passed to the clock recovery circuit 320. The clock recovery circuit 320 processes and filters the received electrical signal to derive a clock signal CLK which is passed back to the optical receiver 310. The optical receiver 310 uses this clock signal CLK to drive a decision circuit that recovers the binary data from the electrical signal. The resulting clocked binary sequence is then passed to the packet recovery and router circuit 330.

The packet recovery and router circuit 330 receives the serial data stream (clocked binary sequence) and clock from the optical receiver 310 and recovers the packet information (i.e. ATM cells) from the serial stream. It also splits the packet information into control signals and data signals and routes these signals accordingly. The data signals are routed to the cell buffer 340.

On the transmit side, the OLT 300 includes a downstream controller 350, a transmit cell buffer 360, and, for each of a plurality of different wavelengths $\lambda_1$ to $\lambda_N$ produced by the OLT 300, a downstream multiplexer 370 and an optical transmitter 380. The OLT 300 also includes, on the transmit side, a wavelength combiner 390.

The downstream controller 350 receives control signals from the OLT and uses these to control the protocol for downstream transmission. It controls the multiplexing of the control and data information on to the individual wavelengths $\lambda_1$ to $\lambda_N$. It also controls which cells are transmitted at which wavelength.

The transmit cell buffer 360 serves to queue cells received from the core network and to pass them to the downstream multiplexer 370 for each wavelength $\lambda_1$ to $\lambda_N$ when enabled by a read enable signal supplied by the downstream controller 350. The downstream controller 350 also receives a buffer status signal from the transmit cell buffer 360 which it uses to monitor the fill status of the transmit cell buffer.

The downstream multiplexer 370 for each wavelength $\lambda_1$ to $\lambda_N$ multiplexes data from the network (via the buffer 360) with control information from the downstream controller 350. The data in the transmit cell buffer 360 is stored in parallel form and accordingly the downstream multiplexer 370 for each wavelength also serves to convert the parallel data into a serial stream suitable for driving the optical transmitter 380 for the wavelength concerned.

The optical transmitter 380 for each wavelength converts the serial electrical data stream supplied by the downstream multiplexer 370 for that wavelength into an optical signal. Each optical transmitter 380 contains a semiconductor laser and modulator.

The wavelength combiner 390 serves to combine the respective optical signals, having the wavelengths $\lambda_1$ to $\lambda_N$, produced by the optical transmitters 380 into a single downstream optical signal for transmission through the PON to the ONUs.

Figure 16:
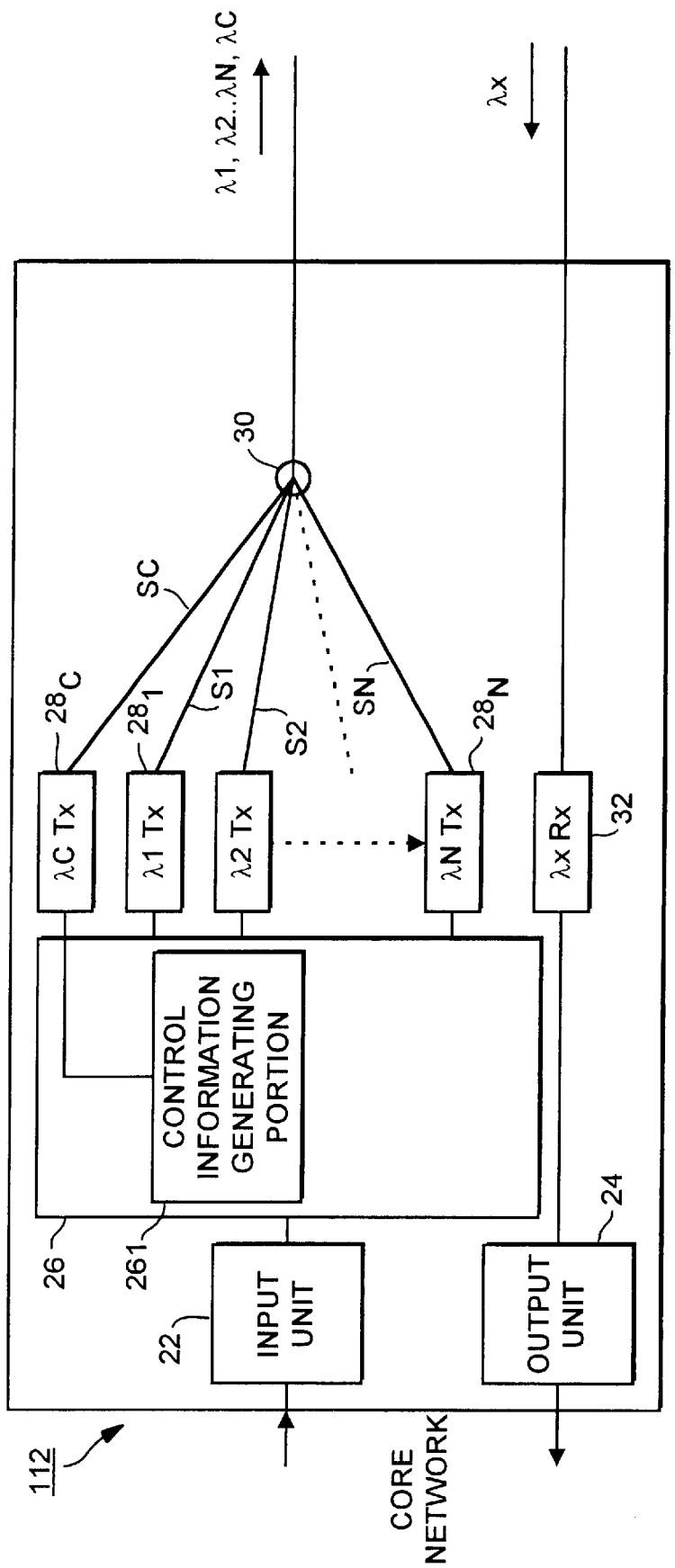
FIG. 16 shows a block diagram of an optical network unit for use in the second embodiment.
Figure 19:
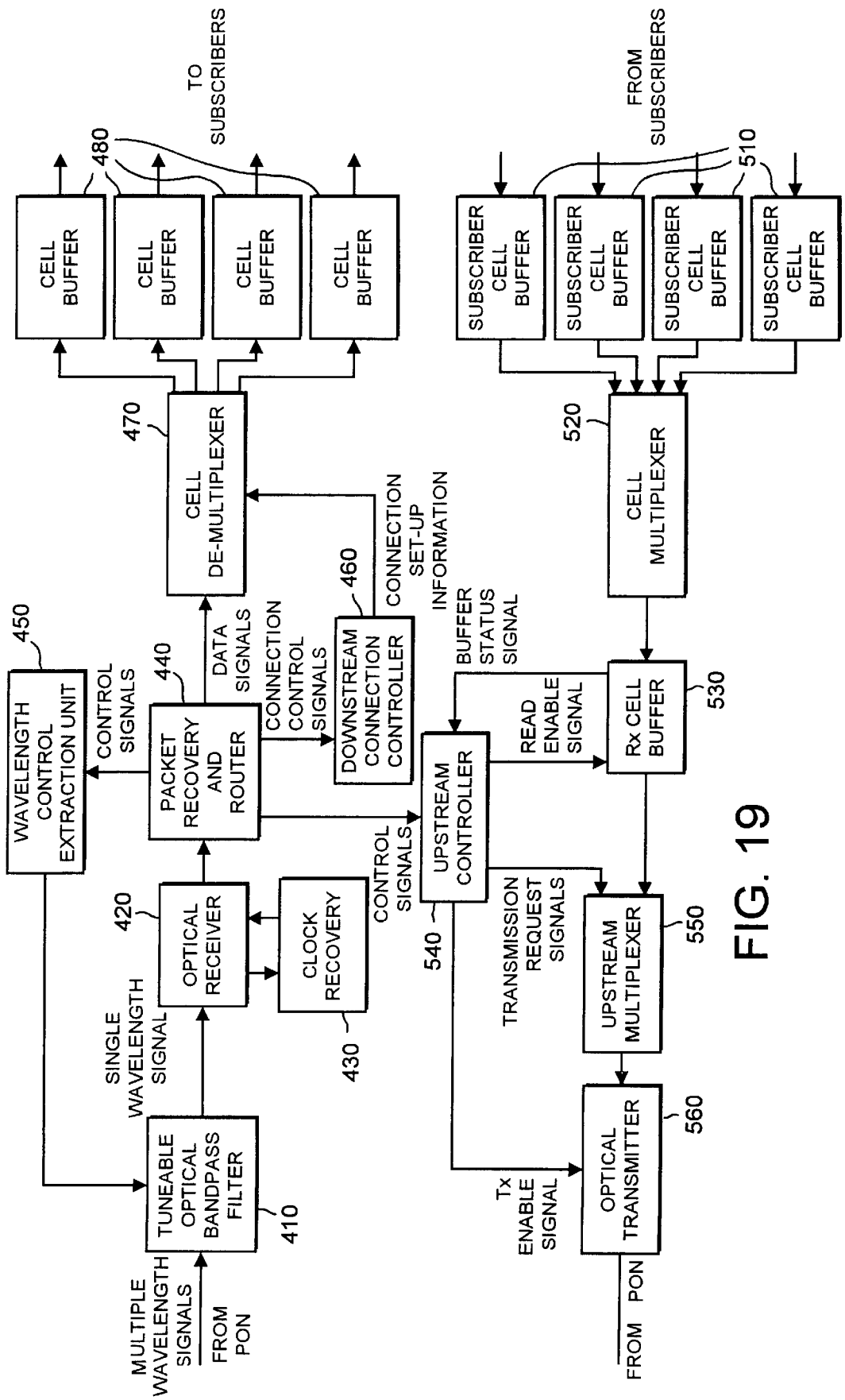
FIG. 19 is detailed block diagram of parts of an optical network unit embodying the present invention.

FIG. 19 shows, in more detail than FIG. 7 or 16, parts of an ONU embodying the present invention.

The ONU 400 includes, on the receive side, a tunable optical bandpass filter 410, an optical receiver 420, a clock recovery circuit 430, a packet recovery and router circuit 440, a wavelength control extraction unit 450, a downstream connection controller 460, a cell de-multiplexer 470 and a plurality of cell buffers 480 corresponding respectively to the subscribers.

The tunable optical bandpass filter 410 receives a downstream optical signal, including a plurality of wavelength-divisional-multiplexed optical signals having wavelengths $\lambda 1$ to $\lambda N$, and extracts therefrom a single one of the optical signals (having one of the wavelengths $\lambda 1$ to $\lambda N$) based on control information supplied thereto by the wavelength control extraction unit 450. The selected optical signal is applied to the optical receiver 420.

The optical receive 420 converts the selected optical signal into a clocked electrical signal, as follows. Firstly, using a PIN diode or avalanche photodiode (APD) it converts the selected optical signal into a corresponding electrical signal. This electrical signal is then amplified. A copy of the electrical signal is passed to the clock recovery circuit 430 which processes and filters the electrical signal to derive therefrom a clock signal CLK which is passed back to the optical receiver 420. The optical receiver 420 uses the clock signal CLK to drive a decision circuit that recovers the binary data from the electrical signal. The resulting clocked binary sequence is passed to the packet recovery and router circuit 440.

The packet recovering router circuit receives the serial stream (clocked binary sequence) from the optical receiver and recovers the packet information (downstream cells) from this stream. It also splits the packet information into control signals and data signals and routes the two sets of signals appropriately. The packet recovery and router circuit 440 also serves to extract protocol information from the downstream optical signals received from the OLT, identifying the required downstream wavelength, and passes the protocol information to the wavelength control extraction unit 450.

The wavelength control extraction unit 450 receives the protocol information from the packet recovery and router circuit 440 and generates the required control information for the tunable optical bandpass filter 410. The data signals derived from the packet information by the packet recovery and router circuit 440 are passed to the cell demultiplexer 470 which demultiplexes the downstream data for individual subscribers and passes it to the per-subscriber cell buffers 480.

Connection control signals derived by the packet recovery and router circuit 440 from the packet information are passed to the downstream connection controller 460 which employs the signals to produce connection set-up information for controlling the cell demultiplexer 470 so as to ensure that the receive downstream data is de-multiplexed to the correct subscriber.

Each cell buffer 470 buffers the cells received for its individual subscriber and allows de-coupling of the PON data rate from the rate at which data is sent to each individual customer or subscriber.

The ONU 400 includes, on the transmit side, a set of subscriber cell buffers 510 corresponding respectively to the subscribers, a cell multiplexer 520, a receive cell buffer 530, an upstream controller 540, an upstream multiplexer 550 and an optical transmitter 560.

The per-subscriber cell buffers 510 buffer the data streams received from their respective subscribers prior to multiplexing of the data streams by the cell multiplexer 520. The resulting multiplexed data from the cell multiplexer 520 is delivered to the receive cell buffer 530 which queues the received cells and passes them to the upstream multiplexer 550 when enabled by a read enable signal supplied thereto by the upstream controller 540. The upstream controller 540 also receives a buffer status signal from the receive cell buffer 530, for use in determining the fill status of the buffer 530.

The upstream controller 540 receives control information from the ONU and the fill status information from the cell buffer 530. It uses this information to control the transmission of upstream information. It controls the optical transmitter 560 using a transmit enable signal, applies transmission request signals to the upstream multiplexer 550 to generate the upstream control information, and enables the cell buffer using the read enable signal when data needs to be transmitted.

The upstream multiplexer 550 multiplexes data from the subscribers with control information from the upstream controller 540. The subscriber data is stored in the receive cell buffer 530 in parallel form and so the upstream multiplexer serves to convert the data from parallel form into a serial stream suitable for driving the optical transmitter 560.

The optical transmitter 560 converts the electrical serial stream supplied from the upstream multiplexer 550 into an upstream optical signal for transmission to the OLT. The optical transmitter contains a semiconductor laser and modulator. The modulator turns the laser ON and OFF as required.

It will be appreciated that the present invention may be used with single-fibre or two-fibre type PONs. If a two-fibre type PON is used the control information could even be sent downstream via one PON (the "upstream" PON) by time-division-multiplexing the downstream control information with any upstream data from the ONUs, leaving the other PON (the "downstream" PON) free to carry downstream data only. The upstream PON could be of lower capacity than the downstream PON. References in the appended claims to a PON are to be interpreted as including two-fibre PONs generally as well as the above specific possibility relating to two-fibre PONs.

What we claim is:

1. A communications network including:
   an optical transmitter for generating a plurality of optical signals having different respective wavelengths, each said optical signal carrying data, and wavelength division-multiplexing the optical signals; and
   a plurality of optical receivers connected to the optical transmitter by way of a passive optical network for receiving the wavelength-division-multiplexed optical signals, each receiver having wavelength selection means operable in dependence upon control information sent from the transmitter to the receiver concerned by way of said passive optical network to select one of the optical signals of said plurality, and also having detection means for processing the selected optical signal to derive therefrom the data carried thereby,
   wherein the control information sent from said optical transmitter to said optical receivers causes at least two different optical receivers to select the same one of the optical signals at different times; and
   wherein said optical transmitter includes:
   a plurality of transmitter devices corresponding respectively to said optical signals, each transmitter device being connected to a transmission control means for receiving therefrom the data allocated by the transmissions control means to its corresponding optical signal and being operable to modulate its corresponding optical signal with the allocated data; and
   wavelength-division-multiplexing combiner means coupled to each of said transmitter device for wavelength-division-multiplexing said optical signals.

2. A network as claimed in claim 1, wherein said control information specifies only changes in optical signal selection to be made by said optical receivers.

3. A network as claimed in claim 1, wherein the control information is carried as overhead information by the optical signals.

4. A network as claimed in claim 1, wherein the control information relevant to a given optical receiver is carried as overhead information by all of the optical signals.

5. A network as claimed in claim 4, wherein the control information is divided into fields corresponding respectively to said optical signals, each field specifying at least one optical receiver that is to select the corresponding optical signal.

6. A network as claimed in claims 5, wherein the fields are ordered differently in the overhead information carried by the different optical signals such that, for each optical signal, the last field in the overhead information is the field that corresponds to the optical signal concerned.

7. A network as claimed in claim 1, wherein the control information relevant to a given optical receiver is carried as overhead information only by the optical signal currently selected by said given optical receiver.

8. A network as claimed in claim 1, wherein two or more of said optical signals carry simultaneously, as overhead information, different control information relevant to different respective said optical receivers.

9. A network as claimed in claim 1, wherein said control information is transmitted from said optical transmitter to said optical receivers by a further optical signal, having a wavelength different from that of each of said optical signals of said plurality, that is wavelength-division-multiplexed with the optical signals of said plurality.

10. A network as claimed in claim 1, wherein the data is transmitted in predetermined time slots from said optical transmitter to said optical receivers, and in each time slot respective units of data are transferred substantially synchronously via said optical signals from the optical transmitter to the optical receivers.

11. A network as claimed in claim 10, wherein the control information is divided into fields corresponding respectively to said optical signals, each field specifying at least one optical receiver that is to select the corresponding optical signal, and said fields contain respectively the control information for the different data units that are to be transmitted in the same time slot by the different optical signals.

12. A network as claimed in claim 10, wherein each data unit comprises at least the payload portion of an ATM cell.

13. A network as claimed in claim 12, wherein the control information includes addressing information from the ATM cell headers.

14. A network as claimed in claims 10, wherein the control information is sent from the transmitter to the receiver concerned by way of said passive optical network, the control information is carried as overhead information by the optical signals, and the overhead information is transmitted in the intervals between successive time slots.

15. A network as claimed in claim 10, wherein the control information is sent from the transmitter to the receiver concerned by way of said passive optical network, the control information relevant to a given optical receiver is carried as overhead information by all of the optical signals, and the overhead information is transmitted in the intervals between successive time slots.

16. A network as claimed in claim 10, wherein the control information is sent from the transmitter to the receiver concerned by way of said passive optical network, the control information relevant to a given optical receiver is carried as overhead information only by the optical signal currently selected by said given optical receiver, and the overhead information is transmitted in the intervals between successive time slots.

17. A network as claimed in claim 10, wherein the control information is sent from the transmitter to the receiver concerned by way of said passive optical network, two or more of said optical signals carry simultaneously, as overhead information, different control information relevant to different respective said optical receivers, and the overhead information is transmitted in the intervals between successive time slots.

18. A network as claimed in claim 10, wherein the control information is sent from the transmitter to the receiver concerned by way of said passive optical network, the control information is carried as overhead information by the optical signals, and the data units transmitted in successive time slots by each optical signal are combined with the overhead information to form a frame.

19. A network as claimed in claim 10, wherein the control information is sent from the transmitter to the receiver concerned by way of said passive optical network, the control information relevant to a given optical receiver is carried as overhead information by all of the optical signals, and the data units transmitted in successive time slots by each optical signal are combined with the overhead information to form a frame.

20. A network as claimed in claim 10, wherein the control information is sent from the transmitter to the receiver concerned by way of said passive optical network, the control information relevant to a given optical receiver is carried as overhead information only by the optical signal currently selected by said given optical receiver, and the data units transmitted in successive time slots by each optical signal are combined with the overhead information to form a frame.

21. A network as claimed in claim 10, wherein the control information is sent from the transmitter to the receiver concerned by way of said passive optical network, two or more of said optical signals carry simultaneously, as overhead information, different control information relevant to different respective said optical receivers, and the data units transmitted in successive time slots by each optical signal are combined with the overhead information to form a frame.

22. A network as claimed in claim 10, wherein the control information is sent in advance of the time slot to which it relates, and each optical receiver includes buffering means for holding the received control information until the time slot concerned.

23. A network as claimed in claim 10, wherein said control information also specifies the time slots in which the optical receivers should change their optical signal selections.

24. A network as claimed in claim 1, wherein in said optical transmitter the data to be transmitted to said optical receivers is allocated to the optical signals of said plurality dynamically in dependence upon the respective amounts of data which it is desired to transmit to the different optical receivers.

25. A communications network as claimed in claim 1 wherein said optical receivers are greater in number than the optical signals of said plurality.

26. An optical transmitter, for connection by way of a passive optical network to a plurality of optical receivers, including:

signal transmission means for generating a plurality of optical signals having different respective wavelengths, each said optical signal carrying data, and wavelength-division-multiplexing the optical signals; and control information generation means for generating control information to be sent to said optical receivers to designate which of the optical signals of said plurality each receiver is to select to derive therefrom the data carried thereby, wherein the control information is changed dynamically in use of the network, the optical transmitter being adapted to send said control information to the optical receivers by way of said passive optical network;

wherein said signal transmission means includes:

a plurality of transmitter devices corresponding respectively to said optical signals, each transmitter device being connected to said information generating control means for receiving therefrom the data allocated by the control information generating means to its corresponding optical signal and being operable to modulate its corresponding optical signal with the allocated data; and wavelength-division-multiplexing combiner means coupled to each of said transmitter device for wavelength-division-multiplexing said optical signals.

27. An optical transmitter as claimed in claim 26, further including transmission control means connected for receiving data to be transmitted to said optical receivers and operable to allocate the received data to the optical signals of said plurality dynamically in dependence upon the respective amounts of data which it is desired to transmit to the different optical receivers.

28. An optical transmitter as claimed in claim 27, wherein said signal transmission means include:

a plurality of transmitter devices corresponding respectively to said optical signals, each transmitter device being connected to said transmission control means for receiving therefrom the data allocated by the transmission control means to its corresponding optical signal and being operable to modulate its corresponding optical signal with the allocated data; and wavelength-division-multiplexing combiner means coupled to each of said transmitter devices for wavelength-division-multiplexing said optical signals.

29. An optical transmitter as claimed in claim 26, further including:

overhead information adding means connected to said control information generation means for receiving therefrom the control information generated thereby and also connected to said signal transmission means for causing the signal transmission means to include the control information as overhead information in the optical signals of said plurality.

30. An optical transmitter as claimed in claim 29, further including:

selection storing means for storing the respective current optical-signal selections made by the optical receivers;

said overhead information adding means being operable, when control information is to be transmitted to one of said optical receivers, to determine from the stored current optical-signal selections the optical signal of said plurality that is currently selected by that optical receiver, and to cause the control information to be carried as overhead information only by the determined optical signal.

31. An optical transmitter as claimed in claim 26, wherein the control information is changed in dependence upon the respective amounts of data which it is desired to transmit to the different optical receivers.

32. A communications network including:

an optical transmitter for generating a plurality of optical signals having different respective wavelengths, each said optical signal carrying data, and wavelength-division-multiplexing the optical signals; and a plurality of optical receivers connected to the optical transmitter by way of a passive optical network for receiving the wavelength-division-multiplexed optical signals, each receiver having wavelength selection means operable in dependence upon control information sent from the transmitter to the receiver concerned by way of said passive optical network to select one of the optical signals of said plurality, and also having detection means for processing the selected optical signal to derive therefrom the data carried thereby, wherein the control information is changed dynamically in use of the network; and, wherein said optical transmitter includes:

a plurality of transmitter devices corresponding respectively to said optical signals, each transmitter device being connected to a transmission control means for receiving therefrom the data allocated by the transmission control is to its corresponding optical signal and being operable to modulate its corresponding optical signal with the allocated data; and wavelength-division-multiplexing combiner means coupled to each of said transmitter device for wavelength-division-multiplexing said optical signals.

33. A communications network as claimed in claim 32, wherein the control information is changed in dependence upon the respective amounts of data which it is desired to transmit to the different optical receivers.

34. A communications network including:

an optical transmitter for generating a plurality of optical signals having different respective wavelengths, each said optical signal carrying data, and wavelength-division-multiplexing the optical signals; and a plurality of optical receivers connected to the optical transmitter by way of a passive optical network for receiving the wavelength-division-multiplexed optical signals, each receiver having wavelength selection means operable in dependence upon control information sent from the transmitter to the receiver concerned to select one of the optical of said plurality, and also having detection means for processing the selected optical signal to derive therefrom the data carried thereby, wherein said control information specifies only changes in optical signal selection to be made by said optical receivers;

wherein said optical transmitter includes:

a plurality of transmitter devices corresponding respectively to said optical signals, each transmitter device being connected to a transmission control means for receiving therefrom the data allocated by the transmission control means to its corresponding optical signal and being operable to modulate its corresponding optical signal with the allocated data; and, wavelength-division-multiplexing combiner means coupled to each of said transmitter device for wavelength-division-multiplexing said optical signals.

35. A communications network including:

an optical transmitter for generating a plurality of optical signals having different respective wavelengths, each said optical signal carrying data, and wavelength-division-multiplexing the optical signals; and a plurality of optical receivers connected to the optical transmitter by way of a passive optical network for receiving the wavelength-division-multiplexing optical signals, each receiver having wavelength selection means operable in dependence upon control information sent from the transmitter to the receiver concerned by way of said passive optical network to select one of the optical signals of said plurality, and also having detection means for processing the selected optical signal to derive therefrom the data carried thereby, wherein the control information relevant to a given optical receiver is carried as overhead information by all of the optical signals;

wherein said optical transmitter includes:

a plurality of transmitter devices corresponding respectively to said optical signals, each transmitter device being connected to a transmission control means for receiving therefrom the data allocated by the transmission control means to its corresponding optical signal and being operable to modulate its corresponding optical signal with the allocated data; and wavelength-division-multiplexing combiner means coupled to each of said transmitter device for wavelength-division-multiplexing said optical signals.

36. A communications network including:

an optical transmitter for generating a plurality of optical signals having different respective wavelengths, each said optical signal carrying data, and wavelength-division-multiplexing the optical signals; and a plurality of optical receivers connected to the optical transmitter by way of a passive optical network for receiving the wavelength-division-multiplexed optical signals, each receiver having wavelength selection means operable in dependence upon control information sent from the transmitter to the receiver concerned to select one of the optical signals of said plurality, and also having detection means for processing the selected optical signal to derive therefrom the data carried thereby, wherein the control information is sent from the transmitter to the receiver concerned by way of said passive optical network and the control information relevant to a given optical receiver is carried as overhead information only by the optical signal currently selected by said given optical receiver;

wherein said optical transmitter includes:

a plurality of transmitter devices corresponding respectively to said optical signals, each transmitter device being connected to a transmission control means for receiving therefrom the data allocated by the transmission control means to its corresponding optical signal and being operable to modulate its corresponding optical signal with the allocated data; and wavelength-division-multiplexing combiner means coupled to each of said transmitter device for wavelength-division-multiplexing said optical signals.

37. A communications network including:

an optical transmitter for generating a plurality of optical signals having different respective wavelengths, each said optical signal carrying data, and wavelength-division-multiplexing the optical signals; and a plurality of optical receivers connected to the optical transmitter by way of a passive optical network for receiving the wavelength-division-multiplexed optical signals, each receiver having wavelength selection means operable in dependence upon control information sent from the transmitter to the receiver concerned to select one of the optical signals of said plurality, and also having detection means for processing the selected optical signal to derive therefrom the data carried thereby, wherein the control information is sent from the transmitter to the receiver concerned by way of said passive optical network and said control information is transmitted from said optical transmitter to said optical receivers by a further optical signal having a wavelength different from that of each of said optical signals of said plurality, that is wavelength-division-multiplexed with the optical signals of said plurality;

wherein said optical transmitter includes:

a plurality of transmitter devices corresponding respectively to said optical signals, each transmitter device being connected to a transmission control means for receiving therefrom the data allocated by the transmission control means to its corresponding optical signal and being operable to modulate its corresponding optical signal with the allocated data; and wavelength-division-multiplexing combiner means coupled to each of said transmitter device for wavelength-division-multiplexing said optical signals.

38. An optical transmitter for connection by way of a passive optical network to a plurality of optical receivers, including:

different signal transmission means for generating a plurality of optical signals having different respective wavelengths, each said optical signal carrying data and wavelength-division-multiplexing the optical signals; and control information generation mews for generating control information to be sent to said optical receivers to designate which of the optical signals of said plurality each receiver is to select to derive therefrom the data carried thereby;

wherein the optical transmitter is adapted to send said control information to the optical receivers by way of sad passive optical network, and further includes:

overhead information adding means connected to said control information generation means for receiving therefrom the control information generated thereby and also connected to said signal transmission men for causing the signal transmission means to include the control information as overhead information in the optical signals of said plurality; and selection storing means for storing the respective current optical-signal selections made by the optical receivers;

said overhead information adding means being operable, when control information is to be transmitted to one of said optical receivers, to determine from the stored current optical-signal selections the optical signal of said plurality that is currently selected by the optical receiver, and to cause the control information to be carried as overhead information only by the determined optical signal; and wherein said signal transmission means includes:

a plurality of transmitter devices corresponding respectively to said optical signals, each transmitter device being connected to said control information generation means for receiving therefrom the data allocated by the control information generation means to its corresponding optical signal and being operable to modulate its corresponding optical signal with the allocated data; and wavelength-division-multiplexing combiner means coupled to each of said transmitter device for wavelength-division-multiplexing said optical signals.

39. An optical transmitter, for connection by way of a passive optical network to a plurality of optical receivers, including:

signal transmission means for generating a plurality of optical signals having different respective wavelengths, each said optical signal carrying data, and wavelength-division-multiplexing the optical signals; and control information generation means for generating control information to be sent to said optical receivers to designate which of the optical signals of said plurality each receiver is to select to derive therefrom the data carried thereby, wherein the optical transmitter is adapted to send said control information to the optical receivers by way of said passive optical network, and wherein said signal transmission means include:

a plurality of transmitter devices corresponding respectively to said optical signals, each transmitter device being connected to said transmission control means for receiving therefrom the data allocated by the transmission control means to its corresponding optical signal and being operable to modulate its corresponding optical signal with the allocated data;

wavelength-division-multiplexing combiner means coupled to each of said transmitter devices for wavelength-division-multiplexing said optical signals; and a further transmitter device coupled to said control information generation means and also coupled to said wavelength-division-multiplexing combiner means and operable to generate a further optical signal, having a wavelength different from that of each of the optical signals of said plurality which further optical signal carries said control information.

* * * * *